United States Patent
Demasi et al.

(10) Patent No.: US 10,868,853 B2
(45) Date of Patent: Dec. 15, 2020

(54) SYSTEM AND METHOD FOR IMAGE FILE GENERATION AND MANAGEMENT

(71) Applicant: Verizon Patent and Licensing Inc., Arlington, VA (US)

(72) Inventors: Rocco P. Demasi, Nanuet, NY (US); Jason M. Iannelli, Township of Washington, NJ (US); Robert T. Milne, Redington Shores, FL (US); Ronald L. Bland, Celina, TX (US); Daniel J. Pfennig, Brockport, NY (US); Michael J. McGuinness, Hilliard, OH (US); Michael L. Bowman, Plain City, OH (US); Lori L. Crimmins, Holly, MI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 156 days.

(21) Appl. No.: 16/004,031

(22) Filed: Jun. 8, 2018

(65) Prior Publication Data
US 2019/0379723 A1 Dec. 12, 2019

(51) Int. Cl.
| | |
|---|---|
| G06F 8/61 | (2018.01) |
| H04L 29/08 | (2006.01) |
| H04L 12/911 | (2013.01) |
| G06F 9/455 | (2018.01) |
| H04N 1/00 | (2006.01) |
| G06F 9/44 | (2018.01) |
| G06F 8/658 | (2018.01) |
| H04L 12/24 | (2006.01) |

(52) U.S. Cl.
CPC ............... *H04L 67/06* (2013.01); *G06F 8/63* (2013.01); *G06F 8/658* (2018.02); *G06F 9/44* (2013.01); *G06F 9/455* (2013.01); *G06F 9/45533* (2013.01); *H04L 47/82* (2013.01); *H04N 1/00204* (2013.01); *H04L 41/0803* (2013.01)

(58) Field of Classification Search
CPC ...... G06F 9/44; G06F 9/4401; G06F 9/44536; G06F 9/4555; G06F 8/63; G06F 8/658; G06F 9/455; H04L 41/0803
See application file for complete search history.

(56) References Cited

U.S. PATENT DOCUMENTS

| | | | | |
|---|---|---|---|---|
| 9,678,769 | B1 * | 6/2017 | Scott | G06F 9/4555 |
| 2009/0083404 | A1 * | 3/2009 | Lenzmeier | G06F 8/63 |
| | | | | 709/221 |

(Continued)

*Primary Examiner* — Jeong S Park

(57) ABSTRACT

An imaging platform may determine whether an image file stored on a client device is a current version of the image file, and may identify, based on determining that the image file on the client device is not the current version of the image file, the current version of the image file in an image file store. The imaging platform may determine, based on identifying the current version of the image file and based on one or more properties associated with a network connection of the client device, a bandwidth allocation for transmitting the current version of the image file to the client device. The imaging platform may transmit, to the client device, a mapping table associated with the current version of the image file, and may transmit, based on the bandwidth allocation and based on the mapping table, the current version of the image file to the client device.

20 Claims, 22 Drawing Sheets

(56) References Cited

U.S. PATENT DOCUMENTS

| | | | | |
|---|---|---|---|---|
| 2009/0187900 A1* | 7/2009 | Nakamoto | ............... | G06F 8/65 |
| | | | | 717/168 |
| 2010/0312805 A1* | 12/2010 | Noonan, III | ............ | G06F 16/16 |
| | | | | 707/822 |
| 2013/0074068 A1* | 3/2013 | Ciano | ....................... | G06F 8/63 |
| | | | | 718/1 |
| 2015/0178096 A1* | 6/2015 | Inbaraj | ..................... | G06F 8/65 |
| | | | | 713/2 |
| 2016/0212728 A1* | 7/2016 | Chang | ................ | H04W 68/025 |
| 2018/0052675 A1* | 2/2018 | Ghosh | ...................... | G06F 8/65 |

\* cited by examiner

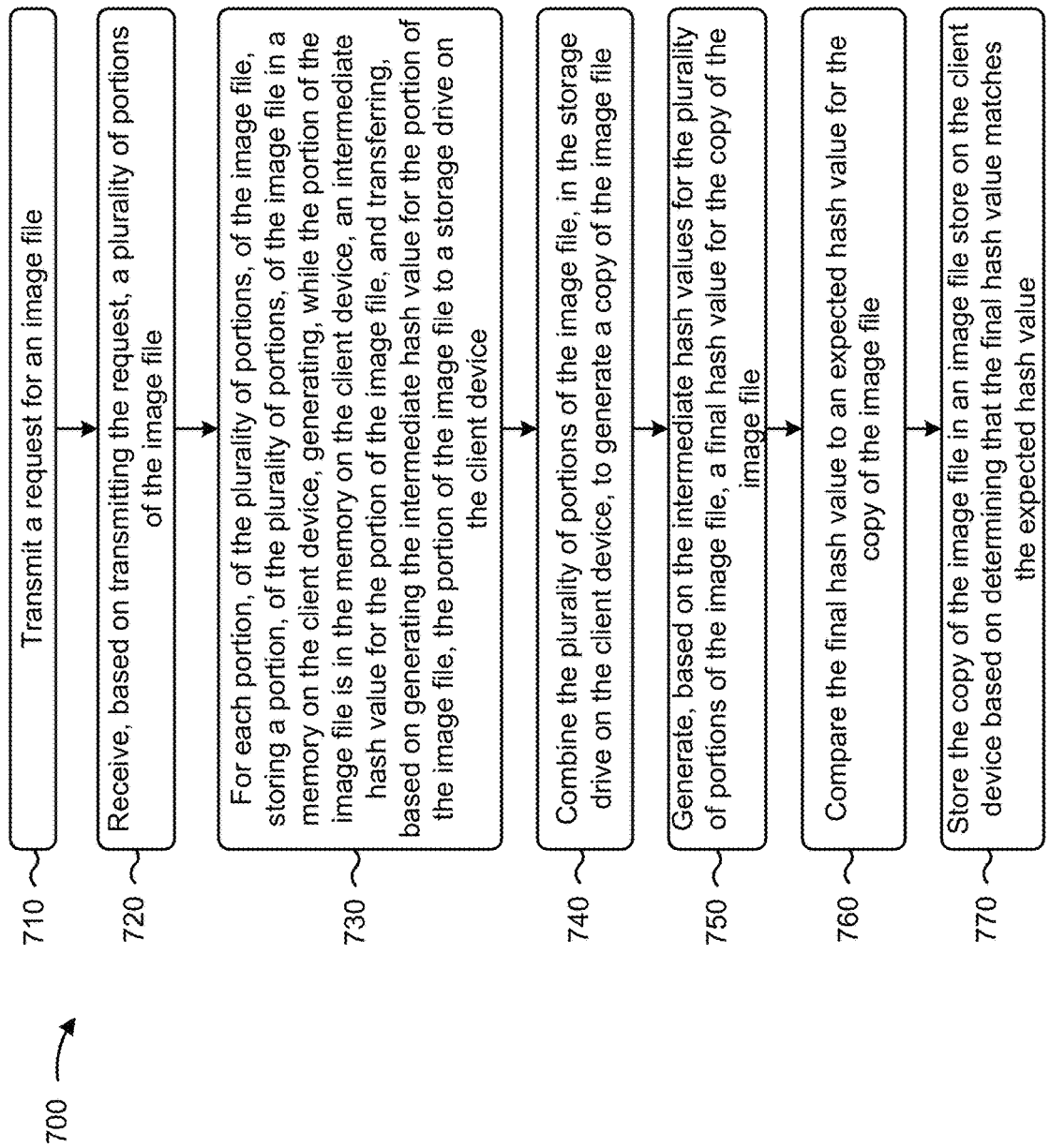

SYSTEM AND METHOD FOR IMAGE FILE GENERATION AND MANAGEMENT

BACKGROUND

An image file may be used to install an operating system, a software application, or some other electronic file on a client device. The client device may receive the image file from a server, another client device, and/or the like, via a network.

BRIEF DESCRIPTION OF THE DRAWINGS

FIG. 7 is a flow chart of an example process for image file generation and management.

DETAILED DESCRIPTION OF PREFERRED EMBODIMENTS

Figure 1A:
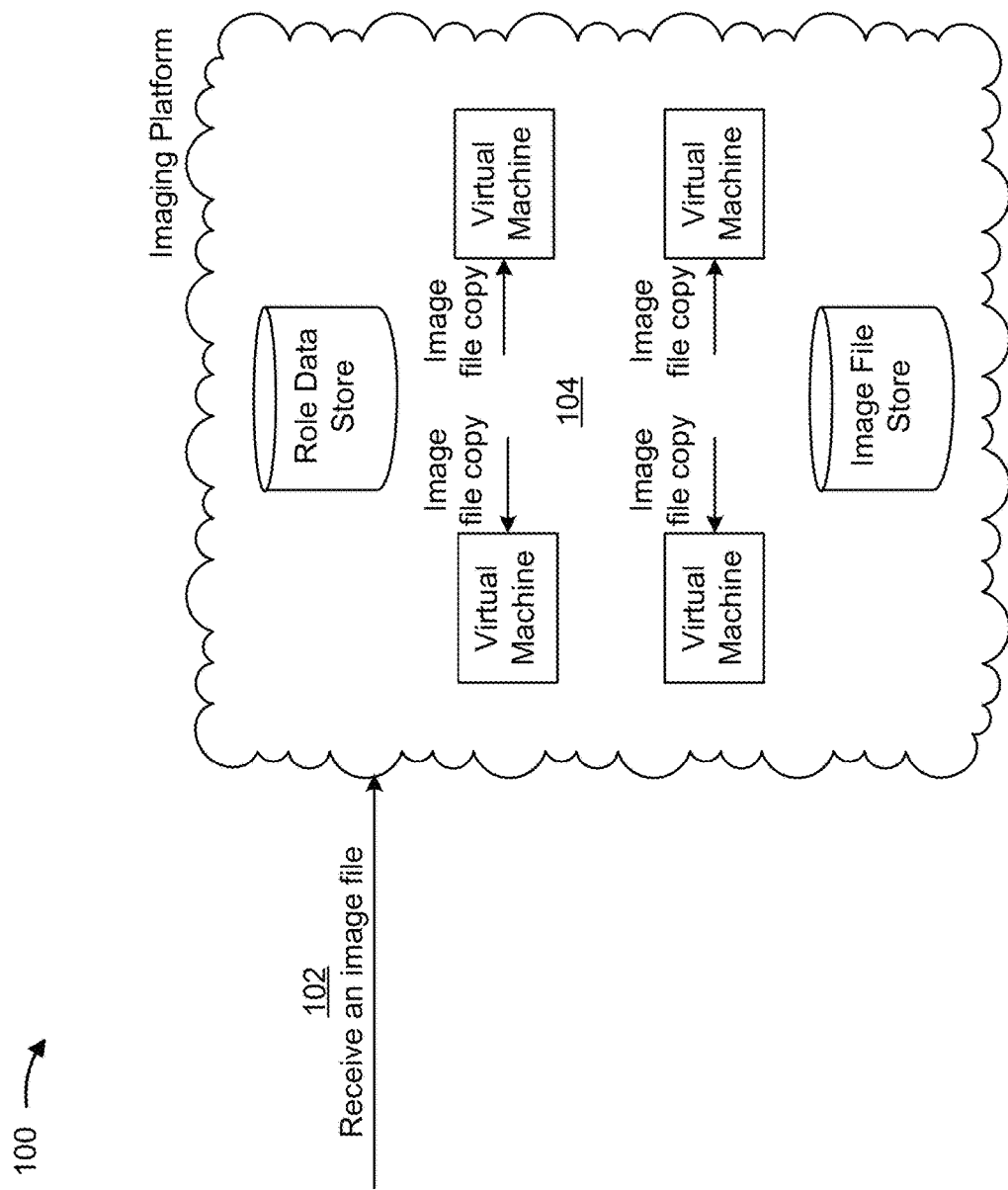
FIGS. 1A-1P are diagrams of an example implementation described herein.

The following detailed description of example implementations refers to the accompanying drawings. The same reference numbers in different drawings may identify the same or similar elements.

An information technology (IT) administrator may manage a plurality of client devices associated with one or more organizations. Managing a client device may include installing an operating system (OS) on the client device, installing one or more software applications on the client device, troubleshooting an issue associated with the client device (e.g., a networking issue, an OS issue, a software application issue, a hardware issue, etc.), repairing the client device (e.g., reinstalling a software application on the client device, reinstalling an OS on the client device, replacing hardware on the client device, etc.), and/or the like.

In some cases, an IT administrator may remotely install an OS, a software application, and/or the like, on the client device over a network. To do so, the IT administrator may use a server device, another client device, and/or the like, to transmit an image file to the client device, and transmit an instruction to the client device to install the OS, the software application, and/or the like, on the client device.

An image file may be an electronic file that includes one or more software elements, such as an OS, a software application, a device driver, and/or the like. In some implementations, an image file may be used to deploy a client device (e.g., by installing an OS and one or more applications on the client device for the first time), to update the client device, (e.g., by updating the OS and/or the one or more software applications), to repair the client device (e.g., by reinstalling the OS and/or the one or more software applications, by restoring the OS and/or the one or more software applications to a previous state, etc.), and/or the like.

In some cases, an image file may be tens of gigabytes in size or more. Due to the image file's large size, transmitting the image file to a client device over a network may consume significant network resources, which may cause other client devices in the network to experience an increase in network latency, a degradation in performance of network-provided services, and/or the like. Moreover, the IT administrator may have to maintain hundreds of different image files, which may require significant storage resources to store.

Some implementations described herein provide an imaging platform capable of generating an aggregated image file that includes a plurality of permutations of an image file. In this way, the imaging platform may store and maintain hundreds of different permutations of the image file in a single aggregated image file, which reduces the complexity of storing and maintaining the plurality of permutations of the image file. Moreover, the imaging platform may deduplicate the plurality of permutations of the image file when generating the aggregated image file so that common portions of the image file between the plurality of permutations are stored once in the aggregated image. In this way, the imaging platform reduces the amount of storage resources used to store the aggregated image file.

In some implementations, the imaging platform may be capable of ensuring that a client device managed by the imaging platform stores the most recent version of an image file by periodically determining whether an image file stored on the client device is a current version of the image file, and transmitting the current version of the image file to the client device based on determining that the image file stored on the client device is not the current version of the image file. In this way, if the client device experiences a fault and needs to be recovered or rebuilt, the imaging platform may recover or rebuild the client device using the updated version of the image file stored on the client device instead of having to transmit the updated version of the image file to the client device over a network, which reduces the amount of time it takes to recover or rebuild the client device, and reduces the amount of time that the client device is unusable or offline.

In some implementations, the imaging platform may determine and dynamically adjust a bandwidth allocation for transmitting an image file to a client device over a network based on one or more properties associated with a network connection of the client device. In this way, the imaging platform may transmit the image file to the client device in a way that does not adversely affect the network connection of the client device and/or network connections of other client devices in the network, which conserves network resources and minimizes network latency and/or degradation in performance of network-provided services.

Some implementations described herein provide a client device that may receive a plurality of portions of an image file from the imaging platform (or from another location), and may generate a plurality of intermediate hash values, for the plurality of portions, while the plurality of portions is in a memory on the client device. The client device may transfer the plurality of portions to a storage drive on the client device, may generate a copy of the image file, and may generate a final hash value, for the copy of the image file, from the plurality of intermediate hash values. In this way, the client device may decrease the amount of time it takes the client device to generate a hash value for the copy of the image file by generating the plurality of intermediate hash values for the plurality of the portions of the image file, while the plurality of portions of the image file are in the memory on the client device.

Figure 1B:
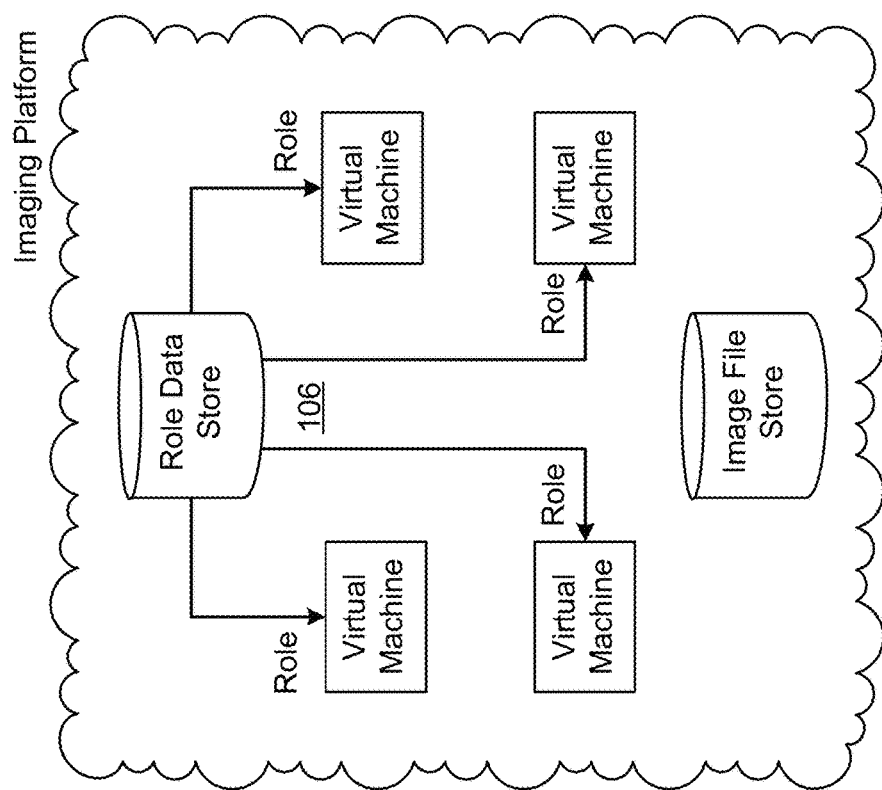
Figure 1C:
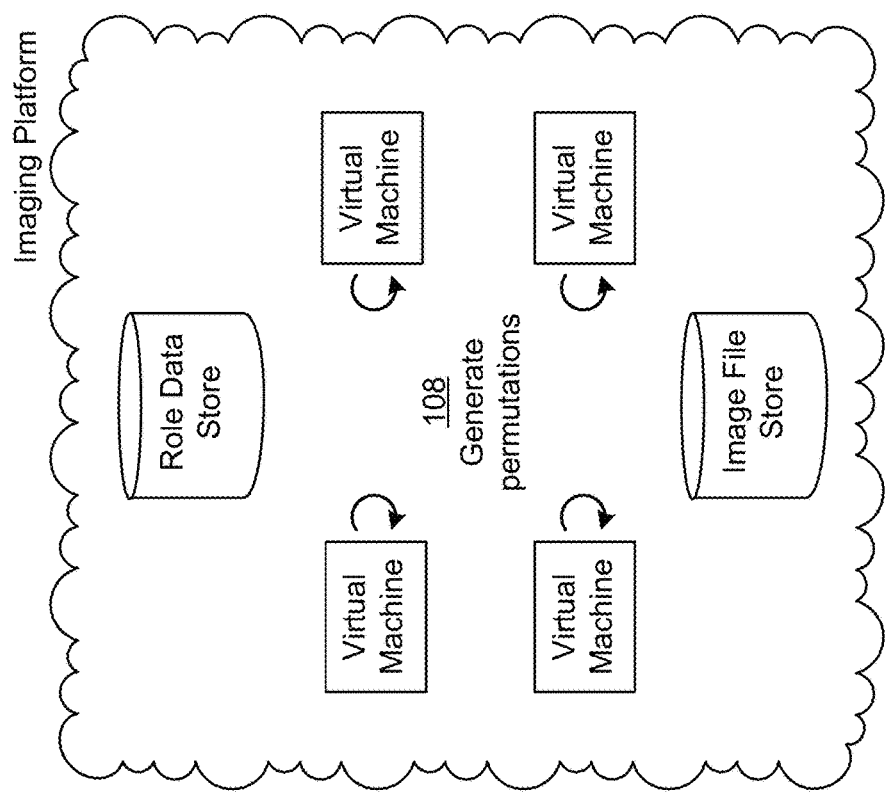
Figure 1D:
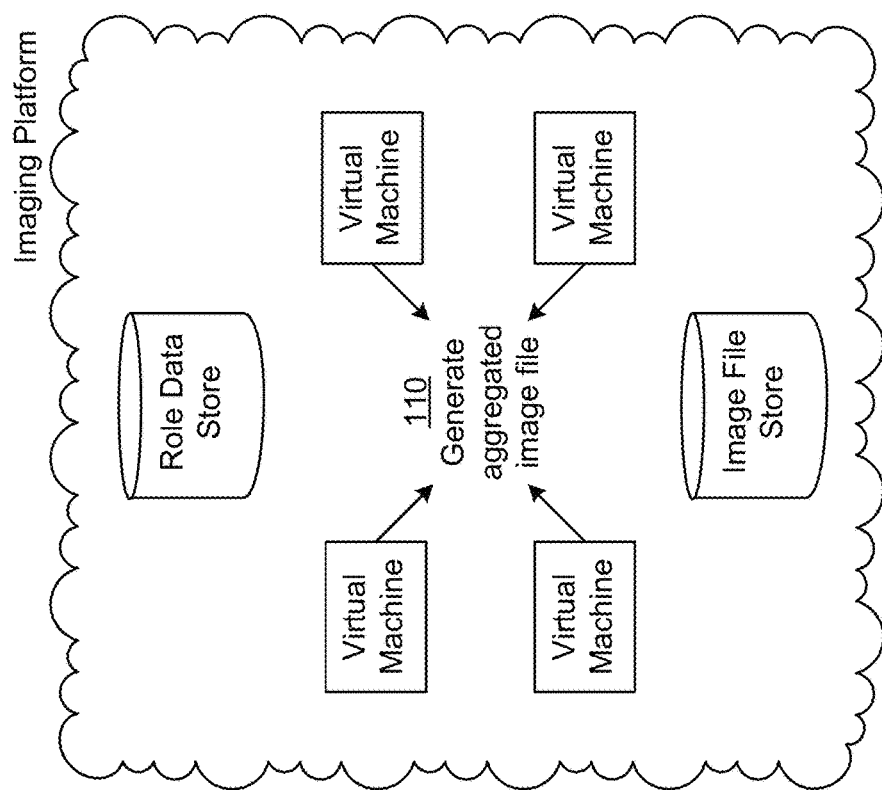
Figure 1E:
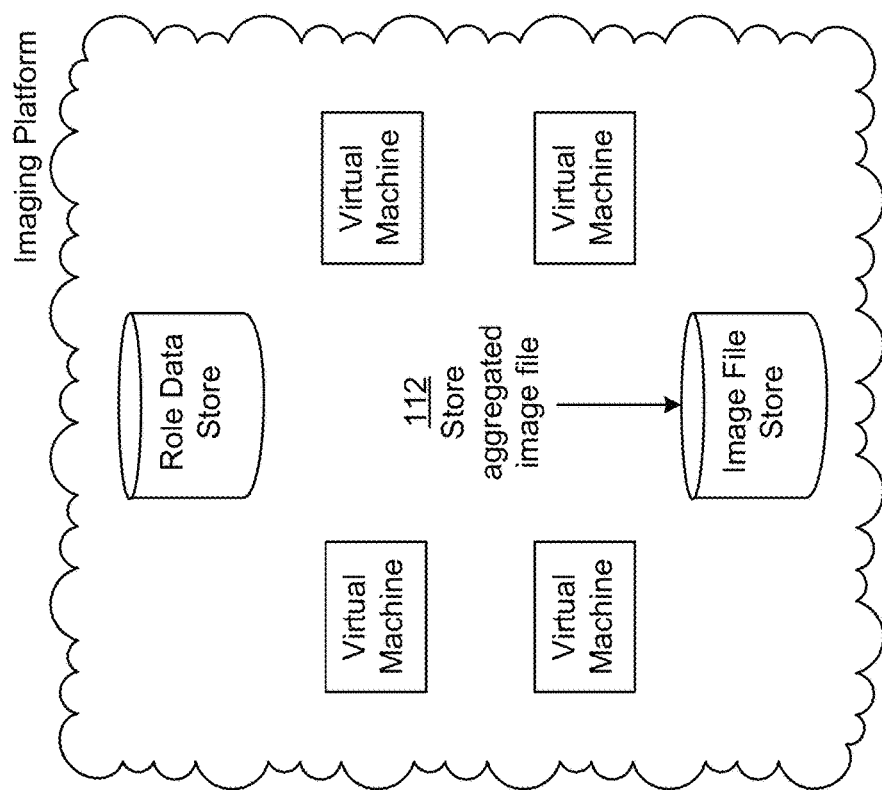
Figure 1F:
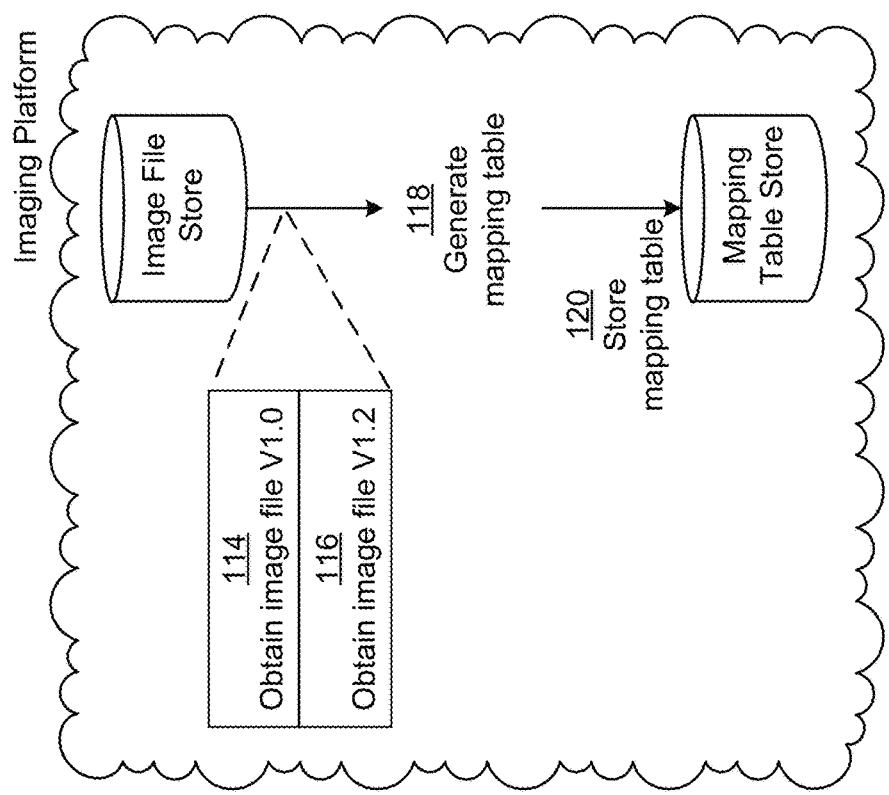
Figure 1G:
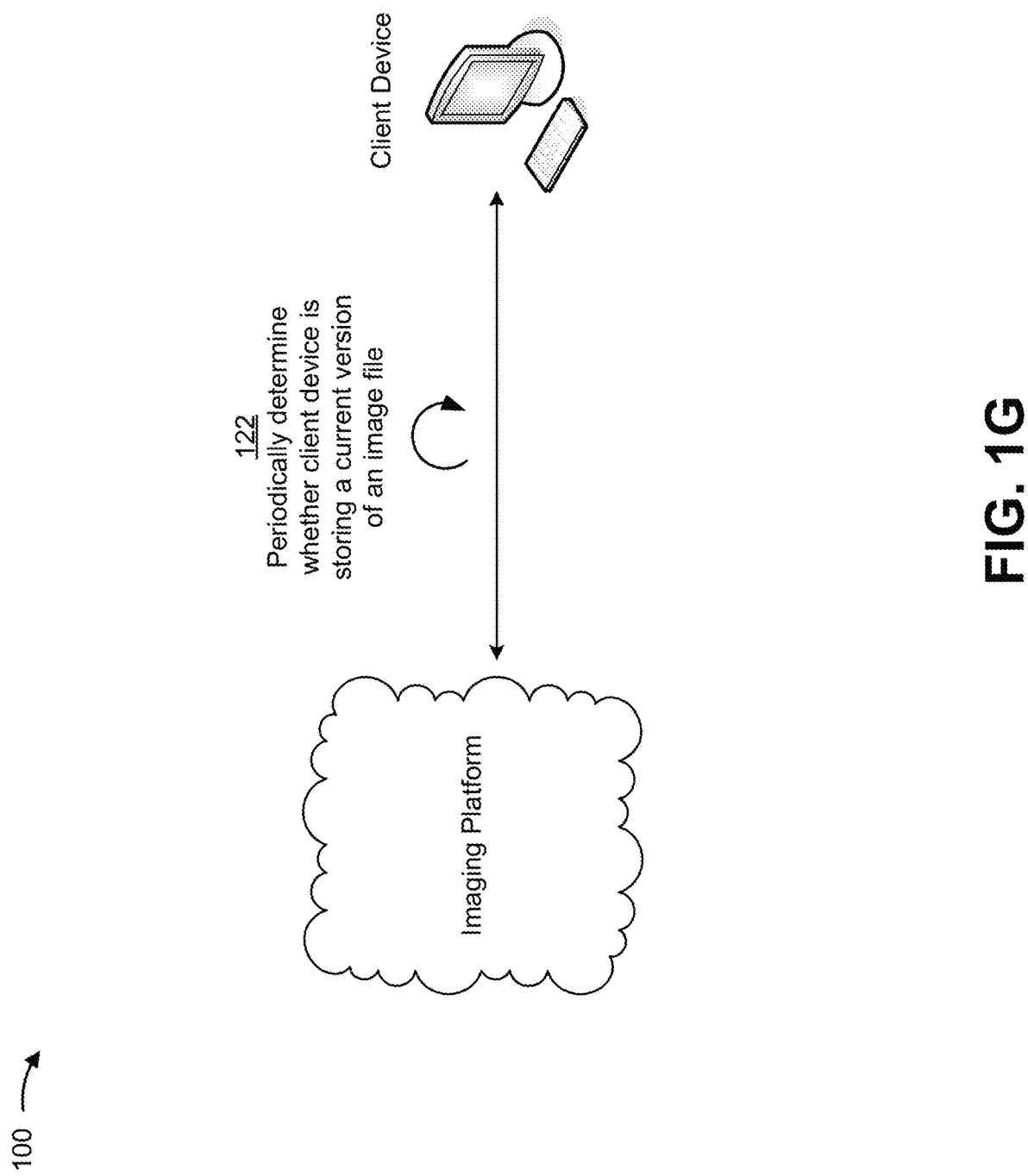
Figure 1H:
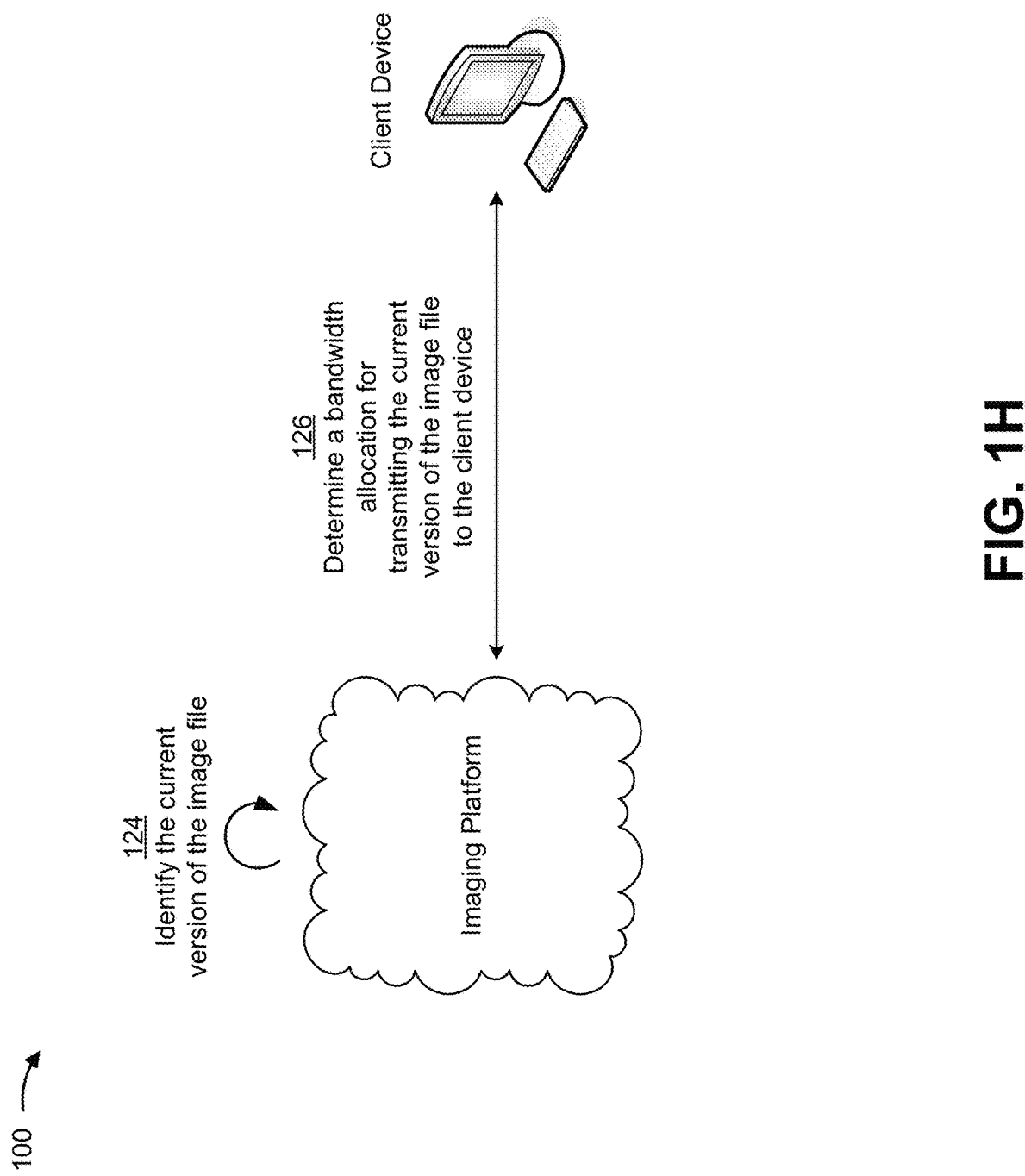
Figure 1I:
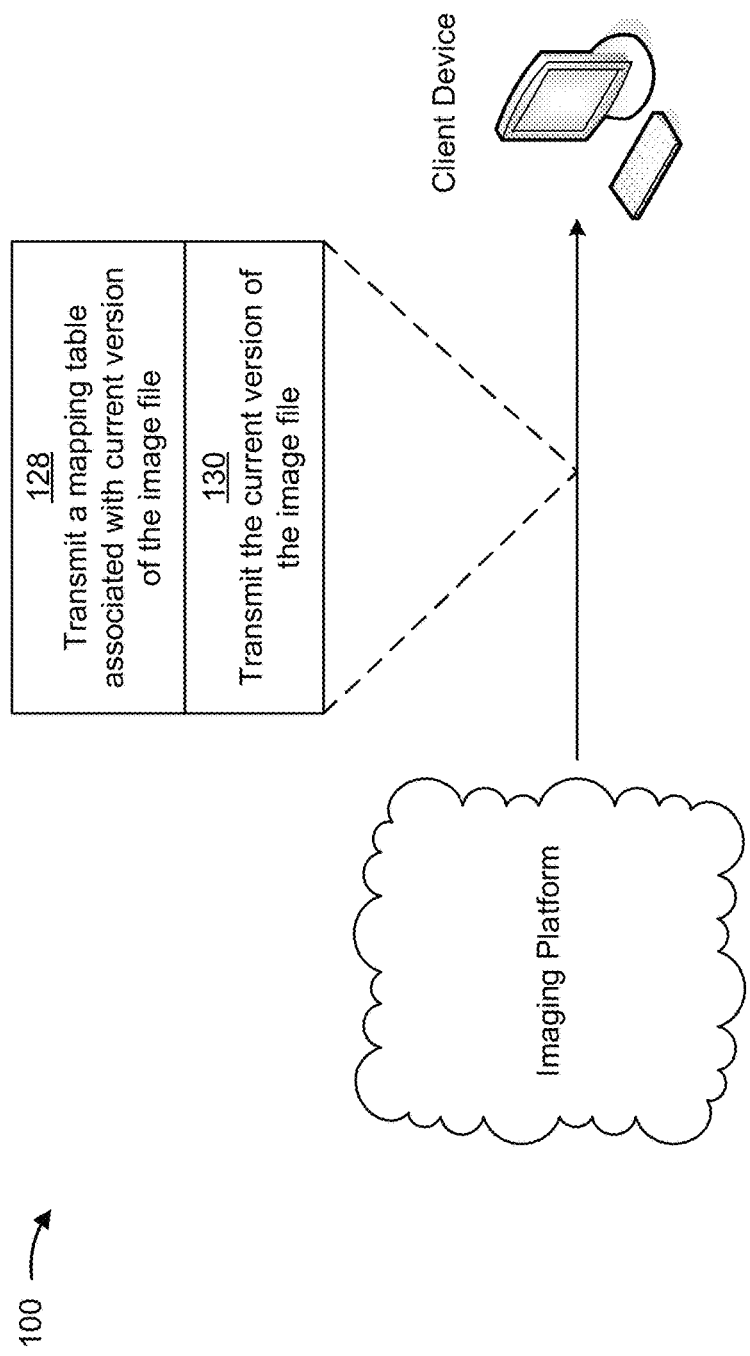
Figure 1J:
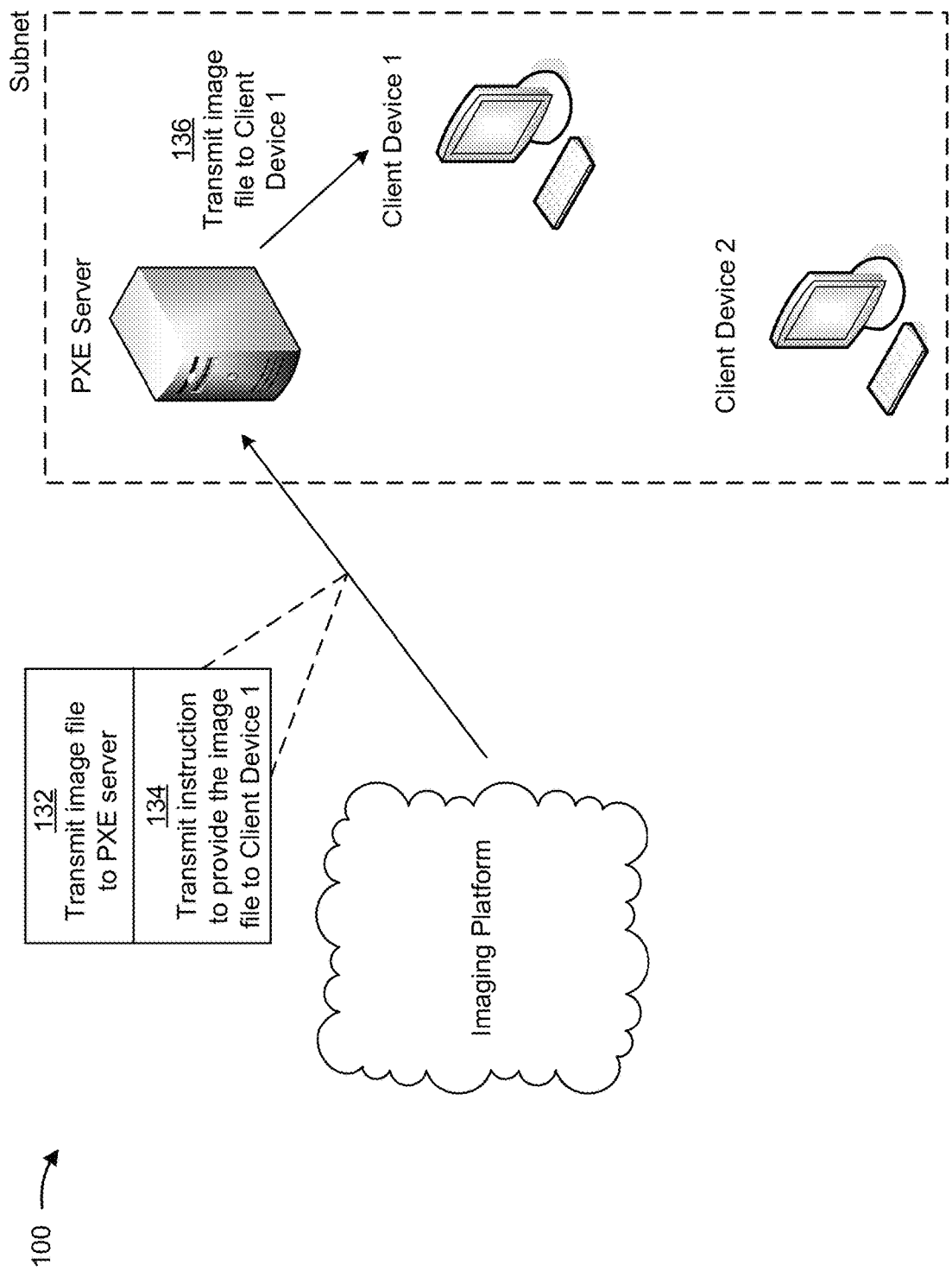
Figure 1K:
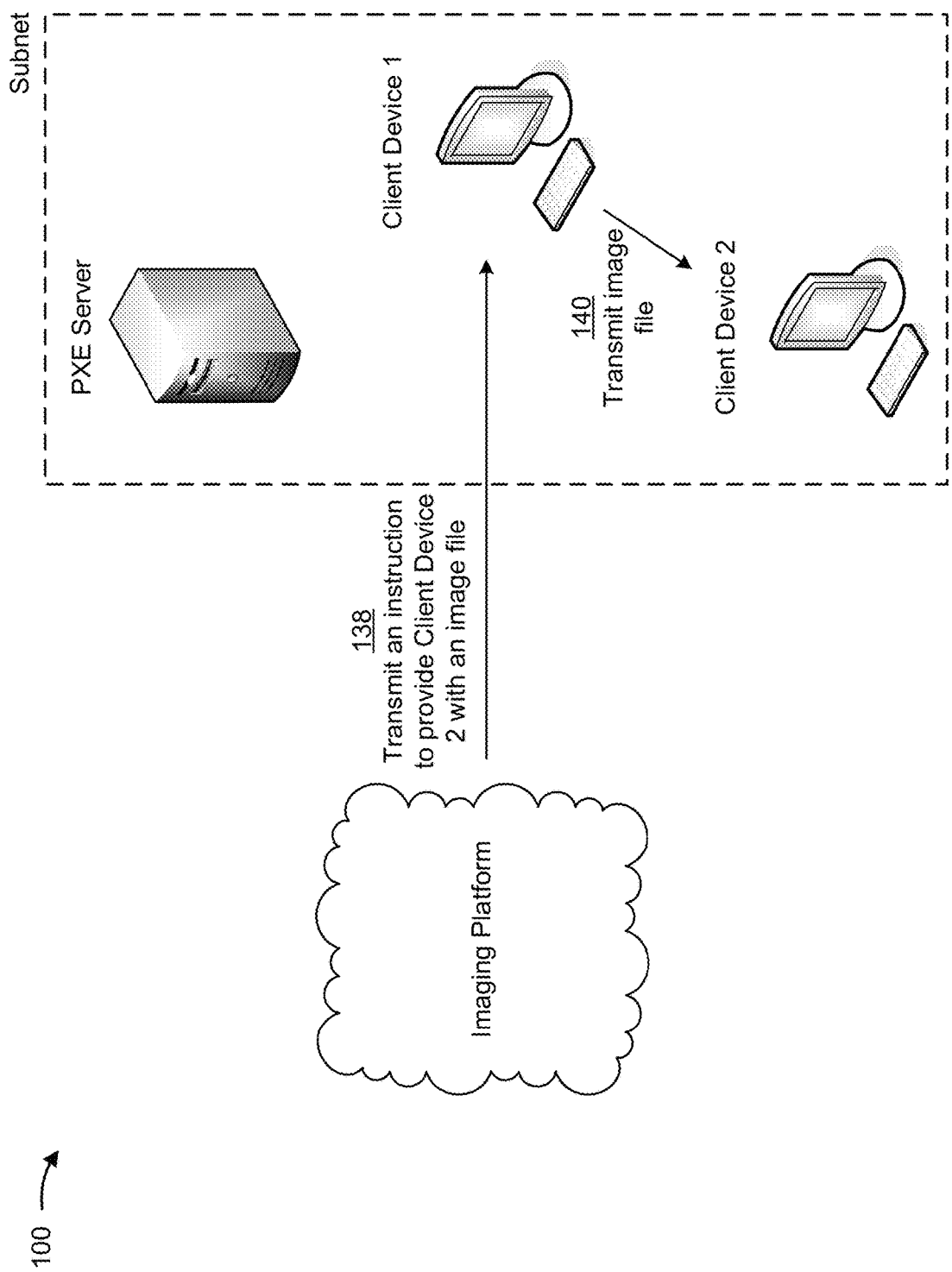
Figure 1L:
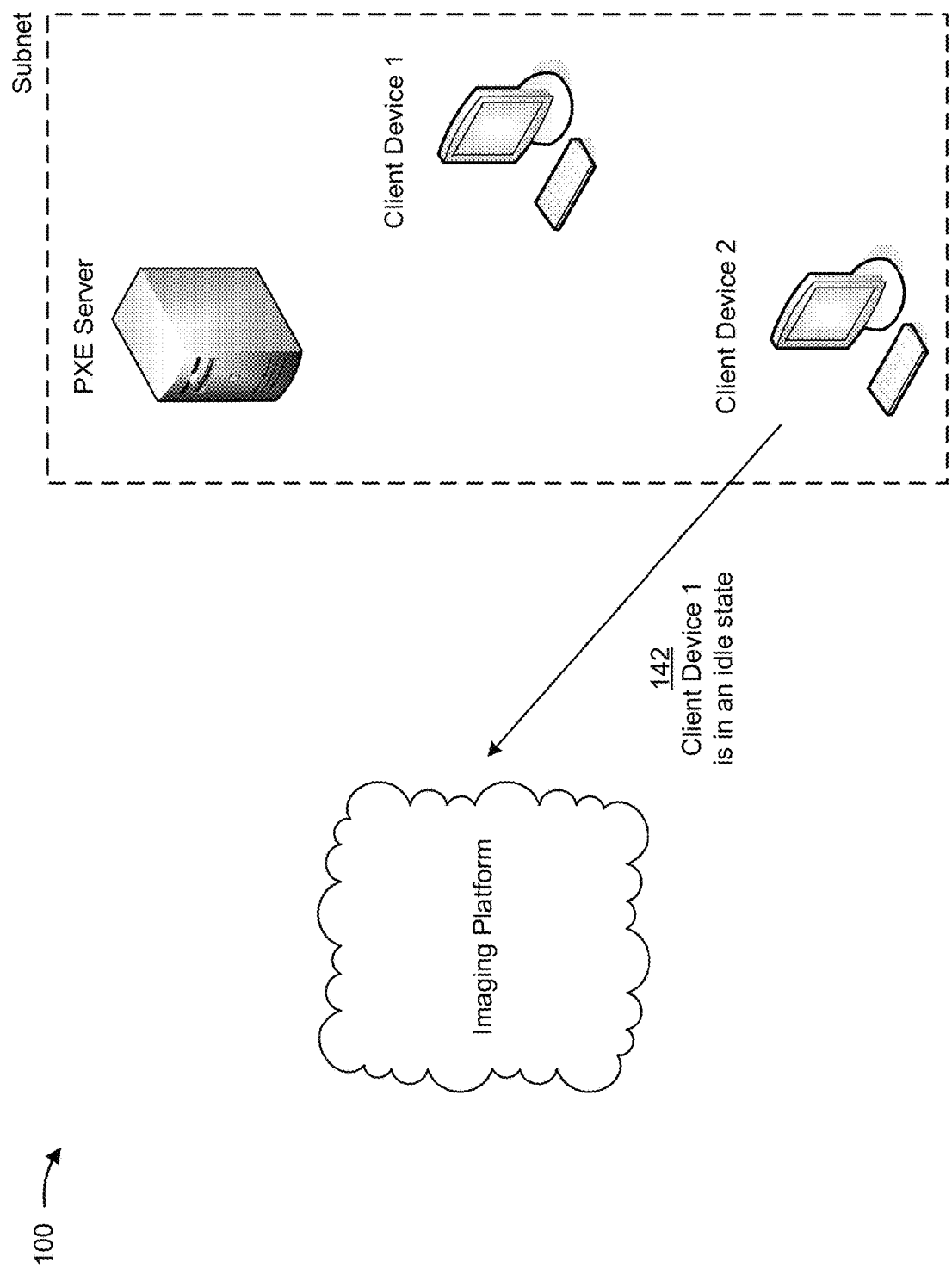
Figure 1M:
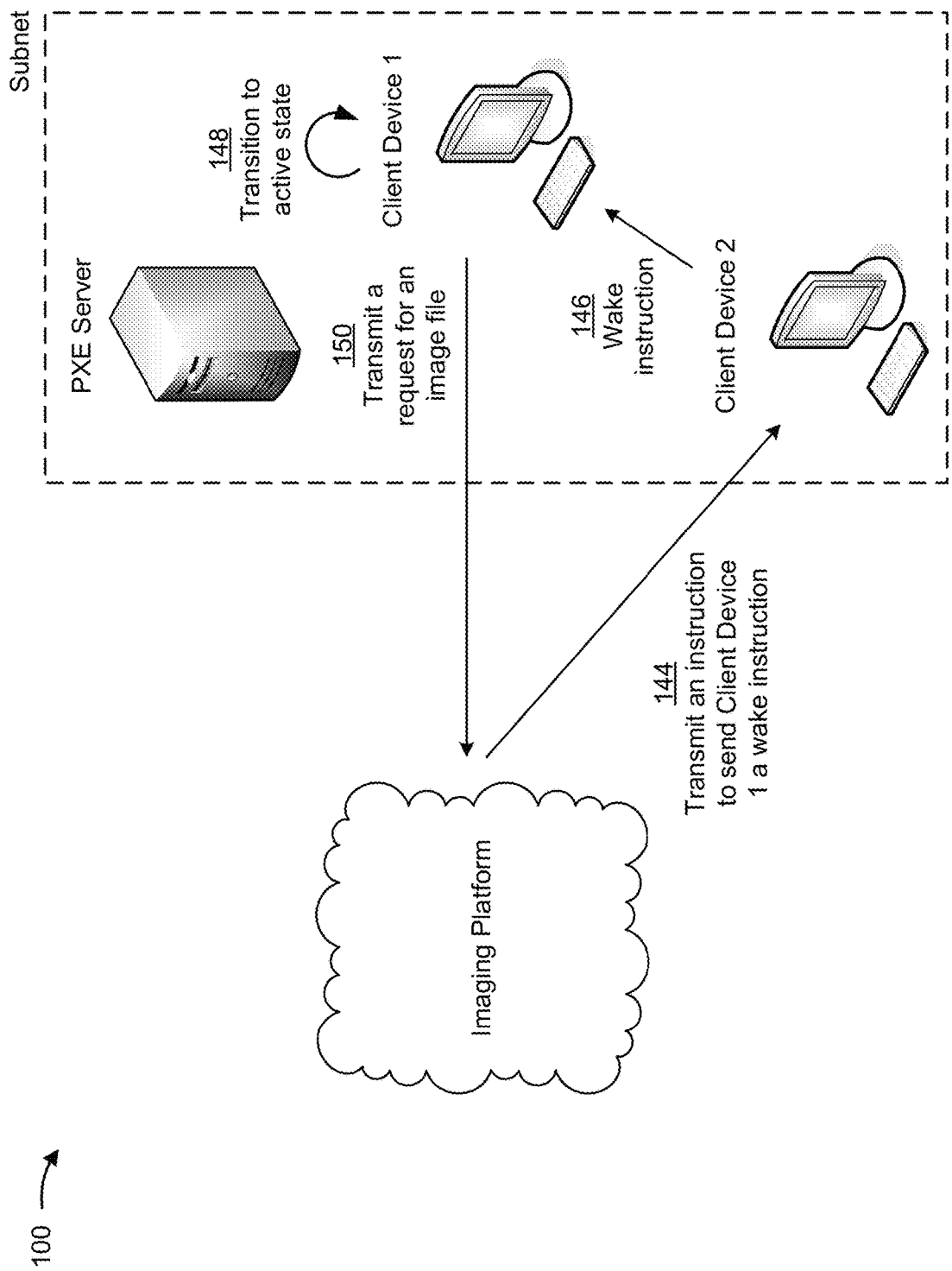
Figure 1N:
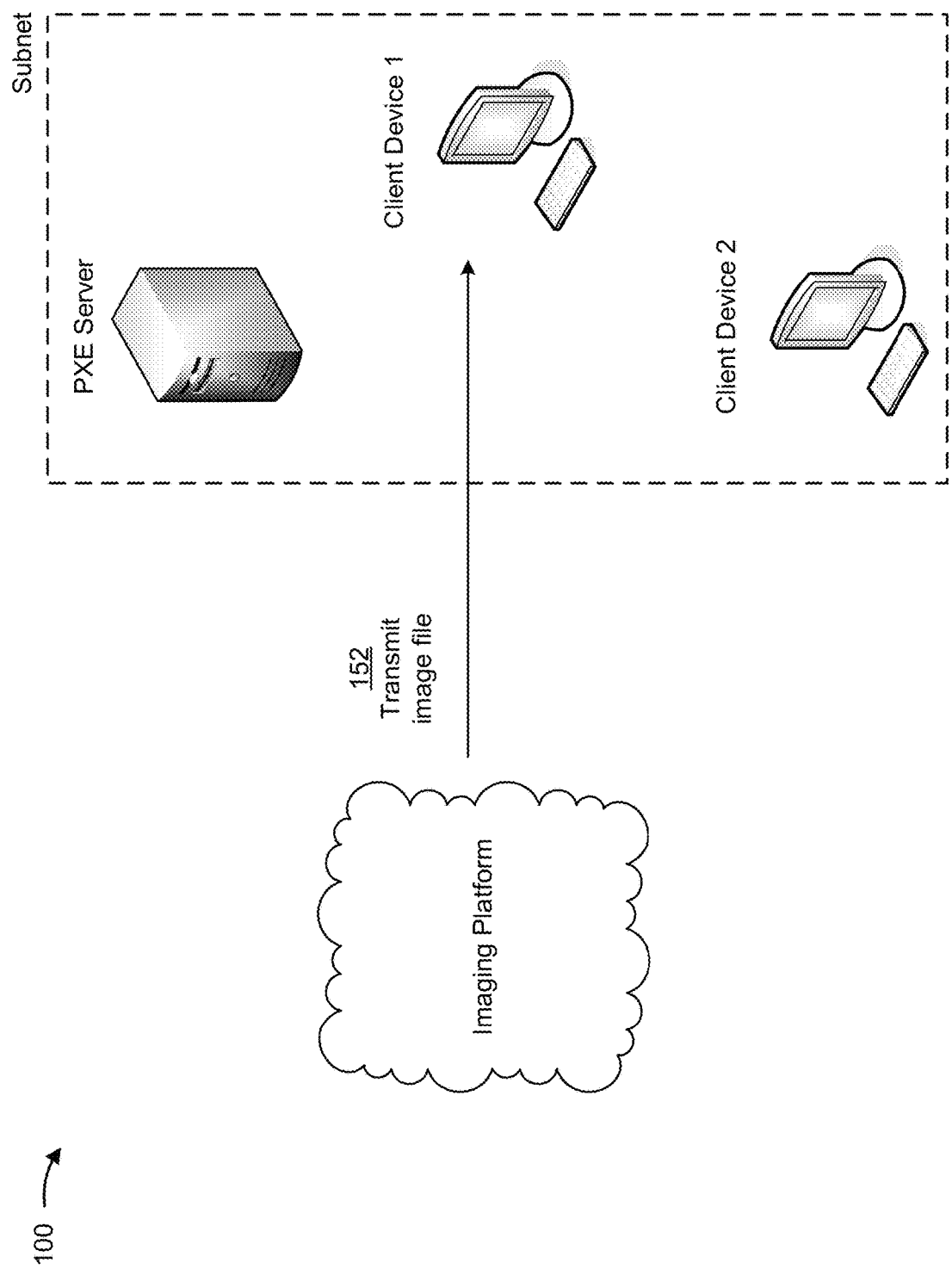
Figure 10:
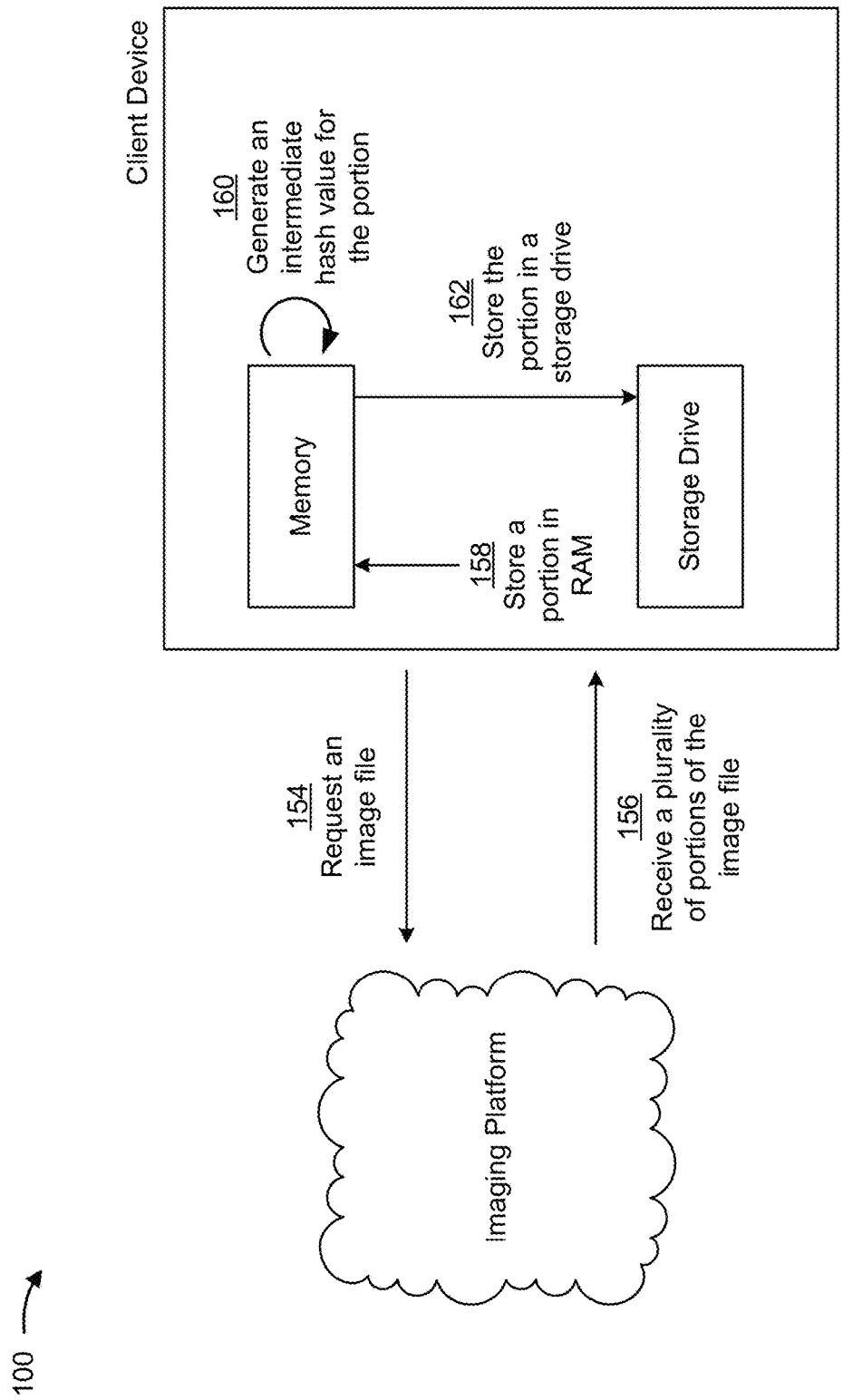
Figure 1P:
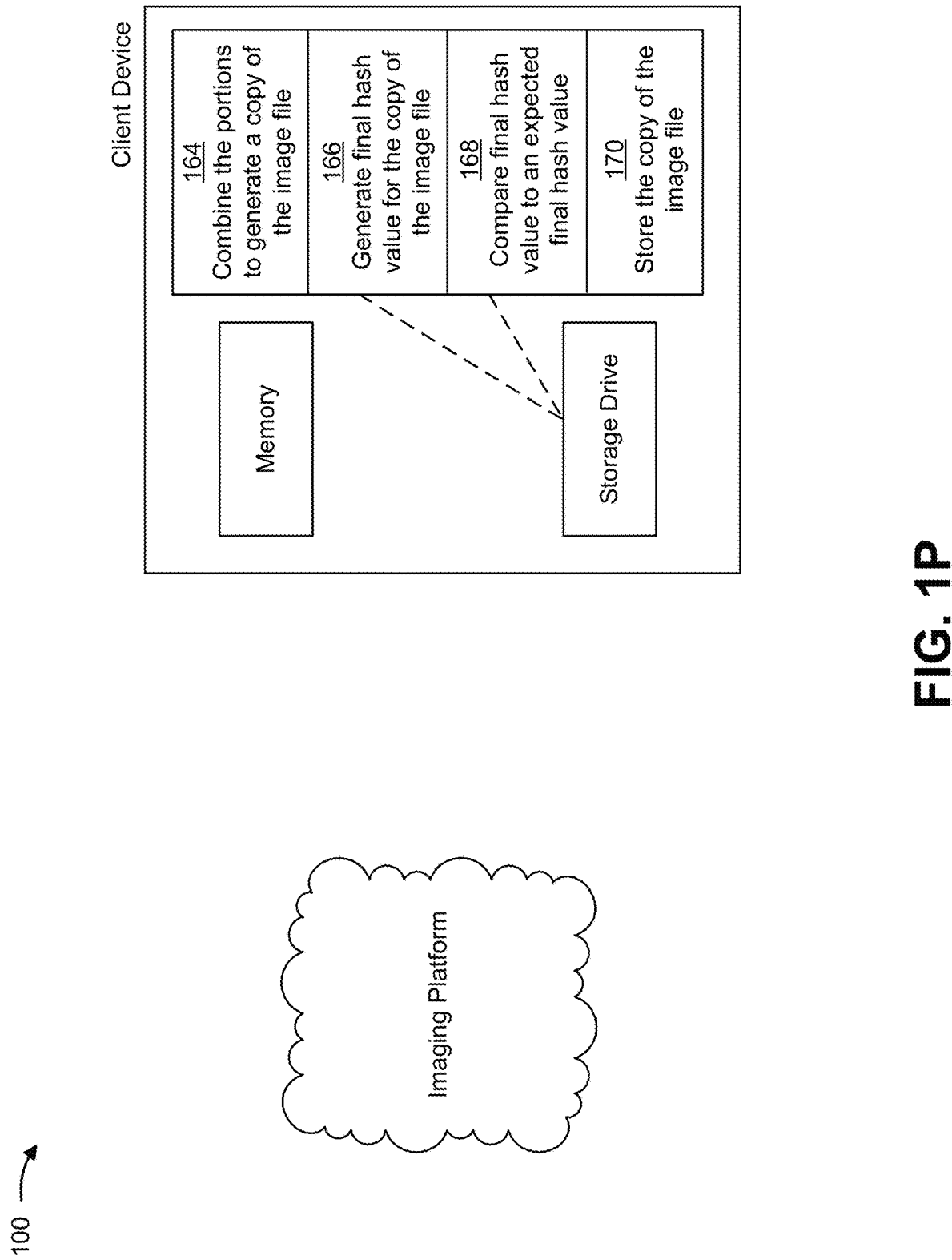

FIGS. 1A-1P are diagrams of an example implementation 100 described herein. As shown in FIGS. 1A-1P, implementations 100 may include one or more client devices, a preboot execution environment (PXE) server, an imaging platform, and/or the like.

The one or more client devices (e.g., client device 1, client device 2, and/or the like), may be capable of performing one or more actions associated with an image file. For example, a client device may request an image file (e.g., from the imaging platform, from the PXE server, from another client device, and/or the like), receive an image file (e.g., from the imaging platform, from the PXE server, from another client device, and/or the like), transmit an image file (e.g., to another client device), load and/or install an image file on the client device, and/or the like. In some implementations, the one or more client devices may be included in a same subnet, of a plurality of subnets, on a network.

The PXE server may be included in the network on the same subnet as the one or more client devices or another subnet. The PXE server may allow the imaging platform and/or a client device to remotely transmit, load, and/or install image files on a PXE-enabled client device of the one or more client devices. A PXE-enabled client device may be a client device that includes a network interface component that stores PXE firmware and/or a unified extensible firmware interface (UEFI) including the PXE firmware. The PXE firmware allows the PXE-enabled client device to obtain an internet protocol (IP) address using the dynamic host configuration protocol (DHCP) (e.g., from a DHCP server on the PXE server or another DHCP server on the network) so that the PXE-enabled client device may access the PXE server on the network. The PXE-enabled client device may access the PXE server to download an OS pre-installation environment image file from the PXE server, and load an OS pre-installation environment into a memory on the PXE-enabled client device from the OS pre-installation environment image file. The OS pre-installation environment may execute and connect to the PXE server, download an OS image file onto the PXE-enabled client device, and install an OS onto the PXE-enabled client device from the OS image file.

The imaging platform may include one or more server devices, such as a cloud-based server device, a middle tier server device, a backend server device, and/or the like. The imaging platform may receive image files, generate and maintain image files, store image files, transmit image files to the one or more client devices and/or the PXE server, transmit instructions to the one or more client devices and/or the PXE server, and/or the like.

Turning now to FIG. 1A, as shown by reference number 102, the imaging platform may receive an image file and generate an aggregated image file from the image file. The aggregated image file may include a plurality of permutations of the image file. A permutation of the image file may include one or more modifications to the image file, such as one or more additional software elements, one or more software elements removed from the image file, one or more changes to a software element included in the image file, and/or the like.

In some implementations, each permutation, of the plurality of permutations of the image file, may be associated with an organizational role, of a plurality of organizational roles, associated with an organization. An organizational role may include, for example, a software developer role, a financial planner role, a drafter role, a supply chain analyst role, a purchasing role, and/or the like.

An organizational role may be associated with a role configuration stored in a role data store, which may be a data structure such as a file system, a database, a table, a linked-list, a tree, and/or the like. In some implementations, the role data store may be included in the imaging platform and/or in another location in the network. The role configuration for the organizational role may include information identifying one or more modifications to the image file that are to be included in a permutation, of the image file, associated with the organizational role.

A permutation, of the image file, associated with an organizational role may include a set of software elements tailored to the organizational role. As an example, a permutation, of the image file, associated with an electrical engineering role may include a schematic design software application, an electronic circuit simulation software application, a printed circuit board (PCB) layout software application, and/or the like. As another example, a permutation, of the image file, associated with a project manager role may include a project scheduling software application, a budget planning software application, a customer requirements management software application, and/or the like.

As shown by reference number 104, the imaging platform may provide copies of the image file to a plurality of virtual machines on the imaging platform and/or in another location in the network.

Turning now to FIG. 1B, and as shown by reference number 106, the imaging platform may provide a plurality of organizational roles to the plurality of virtual machines. In some implementations, each virtual machine, of the plurality of virtual machines, may receive a different organizational role, of the plurality of organizational roles. For example, a virtual machine may receive a graphic designer role, another virtual machine may receive a web developer role, and so on.

Turning now to FIG. 1C, and as shown by reference number 108, the plurality of virtual machines may generate a plurality of permutations of the image file. For example, each virtual machine, of the plurality of virtual machines, may generate a permutation, of the plurality of permutations, of the image file. In some implementations, one or more permutations, of the plurality of permutations, of the image file may be generated in parallel. For example, a first virtual machine may generate a first permutation of the image file at a time that overlaps (either partially or fully) a time that a second virtual machine in generating a second permutation of the image file. In some implementations, the plurality of virtual machines may generate the plurality of permutations of the image file in batches. For example, a first virtual machine may generate a first permutation of the image file and a second virtual machine may generate a second permutation of the image file (e.g., batch 1), and then the first virtual machine may generate a third permutation of the image file and the second virtual machine may generate a fourth permutation of the image file (e.g., batch 2), and so on. In this way, the imaging platform uses the plurality of virtual machines in a parallelized way to generate the plurality of permutations of the image file. This reduces an amount of time it takes the imaging platform to generate the plurality of permutations, which in turn reduces an amount of time it takes the imaging platform to generate the aggregated image file.

A virtual machine may generate a permutation of the image file based on an organizational role received at the virtual machine. To generate the permutation of the image file, the virtual machine may modify the copy of the image file based on a role configuration, stored in the role data store, associated with the received organizational role. For example, if the virtual machine receives a graphic designer organizational role, the virtual machine may add a device driver for a graphics tablet to the copy of the image file, may add one or more graphic design software applications to the copy of the image file, and/or the like.

Turning now to FIG. 1D, and as shown by reference number 110, the imaging platform may generate the aggregated image file. The aggregated image file may include the plurality of permutations of the image file generated by the plurality of virtual machines. The imaging platform may generate the aggregated image file by combining the plurality of the permutations of the image file.

In some implementations, when combining the plurality of permutations of the image file, the imaging platform may deduplicate the plurality of permutations of the image file to reduce a size of the aggregated image file. The imaging platform may deduplicate the plurality of permutations of the image file by including, in the aggregated image file, only one copy of a software element if the software element is included in more than one permutation, of the plurality of permutations, of the image file. For example, if a first permutation of the image file and a second permutation of the image file each include a same word processing software application, the imaging platform may incorporate one copy of the word processing software application in the aggregated image file. In some implementations, the imaging platform may perform deduplication of the plurality of permutations of the image file per software element (e.g., by comparing software elements included in each permutation, of the plurality of permutations, of the image file to determine redundant software elements), per electronic file (e.g., by comparing electronic files included in each permutation, of the plurality of permutations, of the image file to determine redundant electronic files), and/or the like.

In some implementations, the imaging platform may generate a respective instruction (e.g., a script and/or the like) for a permutation of the image file, included in the aggregated image file, and may include the respective instruction in the aggregated image file. The respective instruction for the permutation of the image file may include an instruction to install one or more software elements, associated with the permutation of the image file and included in the aggregated image file (e.g., on a client device, on a server, and/or another device). For example, a respective instruction for a permutation of the image file associated with a publisher role may include an instruction to install an OS included in the aggregated image file, a publishing software application included in the aggregated image file, and/or the like, on a client device.

Turning now to FIG. 1E, and as shown by reference number 112, the imaging platform may store the aggregated image file in an image file store (e.g., a data structure on the image platform and/or another location in the network) along with other image files and/or other aggregated image files. In some implementations, the imaging platform may transmit the aggregated image file to the PXE server, to the one or more client devices, and/or the like. In some implementations, instead of, or in addition to, combining the plurality of permutations of the image file into the aggregated image file, the imaging platform may store the plurality of permutations of the image file in the image file store.

For example, the imaging platform may provide a notification to a client device that the aggregated image file is available in the image file store. The imaging platform may receive, from the client device and based on the notification, a request for the aggregated image file, and may transmit the aggregated image file to the client device based on receiving the request. The notification may be an email, a popup notification on a graphical user interface (GUI) of the client device, and/or the like. In some implementations, the imaging platform may provide the notification at a periodic interval (e.g., once a day, once an hour, etc.), and may adjust the periodic interval (e.g., provide the notification once a day for one week, and then once an hour after the one week). In some implementations, a user of the client device may interact with the notification to transmit, to the imaging platform, the request for the aggregated image file, to delay transmission of the aggregated image file to the client device, and/or the like.

In some implementations, when transmitting the aggregated image file to a client device, the imaging platform may identify an organizational role, of the plurality of organizational roles, assigned to the client device (e.g., based on information stored on the client device, based on an asset tag assigned to the client device, based on a user associated with the client device, and/or the like), and may transmit, to the client device, an instruction to install a permutation of the image file, included in the aggregated image file, associated with the organizational role. The client device may receive the aggregated image file and the instruction, and may install the permutation of the image file, included in the aggregated image file, associated with the organizational role, based on the received instruction. For example, the received instruction may include an instruction to execute a script, included in the aggregated image file, associated with the permutation of the image file. The client device may execute the script based on the received instruction, which may cause the client device to install, on the client device, one or more software elements, associated with the permutation of the image file, included in the aggregated image file.

In some implementations, the imaging platform may manage different versions of an image file, an aggregated image file, and/or the like. For example, the imaging platform may store version 1.0 of an image file in the image file store, and may receive version 1.2 of the image file. Instead of transmitting the entire version 1.2 of the image file to the one or more client devices and/or the PXE server in the network, the imaging platform may generate a mapping table between the different versions of the image file so that only portions that are different between the different versions of the image file are transmitted to the one or more client devices and/or the PXE server in the network. In this way, the imaging platform reduces the amount of network resources used to transmit the updated version of the image file over the network and reduces the amount of storage resources used on the one or more client devices and/or the PXE server for storing image files.

Turning now to FIG. 1F, and as shown by reference number 114, the imaging platform may obtain a first version (e.g., a previous version, and old version, and outdated version, etc.) (e.g., version 1.0) of the image file. For example, the imaging platform may obtain the first version of the image file from the image file store. As shown by reference number 116, the imaging platform may obtain a second version (e.g., a current version, a latest version, etc.) (e.g., version 1.2) of the image file. For example, the imaging platform may obtain the second version of the image file from the image file store.

As shown by reference number 118, the imaging platform may generate a mapping table for the first version of the image file. The mapping table may include information identifying one or more portions of the first version of the image file that are not included in the second version of the image file (i.e., one or more portions that are new to the first version of the image file), information identifying one or more portions of the second version of the image file that are not included in the first version of the image file (i.e., one or more portions that were removed from the second version of the image file), information identifying a mapping between one or more first portions of the first version of the image file that are unchanged from one or more second portions of the second version of the image file, and/or the like. An example of a mapping table is described below in connection with FIG. 2.

A portion included in the first image file and/or a portion included in the second version of the image file may be a software element, an electronic file included in a software element, a segment of data of a specific quantity (e.g., a 512 kilobyte segment of data, a 1 megabyte segment of data, etc.), and/or the like. For example, a portion included in the first version of the image file may be associated with a graphics editing software application, and a portion included in the second version of the image file may also be associated with the graphics editing software application, may be associated with a different software application, or may be associated with a different software element, such as a device driver, OS, and/or the like.

The imaging platform may determine that a first portion included in the first version of the software image is unchanged from a second portion included in the second version of the image file based on various factors, such as a version number of a software application associated with the first and second portions, based on detecting a change to one or more electronic files included in the first and second portions, based on determining that a sequence of bits or bytes included in the first portion does not match a sequence of bits or bytes included in the second portion, and/or the like.

In some implementations, the imaging platform may generate the mapping table for the first version of the image file by comparing the first version of the image file with the second version of the image file. For example, the imaging platform may compare a plurality of portions of the first version of the image file to a plurality of portions of the second version of the image file.

In some implementations, the imaging platform may perform a one-to-one comparison of the plurality of portions of the first version of the image and the plurality of portions of the second version of the image file. For example, the imaging platform may compare a first portion of the first version of the image file (e.g., a first 1 megabyte of the first version of the image file) with a second portion of the second version of the image file (e.g., a first 1 megabyte of the second version of the image file), may compare a third portion of the first version of the image file (e.g., a second 1 megabyte of the first version of the image file) with a fourth portion of the second version of the image file (e.g., a second 1 megabyte of the second version of the image file), and so on. The mapping table for the first version of the image file may include information identifying whether the first portion of the first version of the image file and the second portion of the second version of the image file match (i.e., the first portion is the same as the second portion, thus indicating that the first portion is unchanged from the second portion), whether the third portion of the first version of the image file and the fourth portion of the second version of the image file match, and so on.

In some implementations, the imaging platform may compare each portion, of the plurality of portions, of the first version of the image file to the plurality of portions of the second version of the image file. For example, the imaging platform may compare a first megabyte of the first version of the image file to all of the megabytes (or the megabytes that have not already been identified as being mapped to another megabyte in the first version of the image file) of the second version of the image file, may compare a second megabyte of the first version of the image file to all of the megabytes of the second version of the image file, and so on. The mapping table for the first version of the image file may include information identifying a pointer to where each megabyte, in the first version of the image file, maps to the second version of the image file, if the imaging platform identifies a match for the megabyte.

As shown by reference number 120, the imaging platform may store the mapping table for the first version of the image file, along with other mapping tables, in a mapping table store (e.g., a data structure on the image platform and/or another location in the network).

In some implementations, a client device storing a second version of the image file may request, from the imaging platform, the first version of the image file. The imaging platform may determine, based on receiving the request for the first version of the image file, that the client device is storing the second version of the image file. The imaging platform may transmit, based on determining that the client device is storing the second version of the image file, the mapping table for the first version of the image file to the client device. In this way, the client device may download (e.g., from the imaging platform, from the PXE server, from another client device in the network, and/or the like) portions of the first version of the image file that are different from the second version of the image file instead of the entire first version of this image file. This reduces the amount of storage resources on the client device used for storing images files, and reduces the amount of network resources used to transmit image files over the network.

Turning now to FIG. 1G, and as shown by reference number 122, the imaging platform may periodically determine whether a client device, of the one or more client devices, is storing a current version of an image file. For example, the imaging platform may periodically (e.g., once a day, once a week, once a month, etc.) request version information associated with one or more image files stored on the client device. The client device may transmit, based on receiving the request, the version information to the imaging platform. The version information may identify a respective version associated with an image file, of the one or more image files, stored on the client device.

The imaging platform may determine that an image file, of the one or more image files, stored on the client device is not the current version of the image file based on receiving the version information from the client device. To do so, the imaging platform may identify, based on the version information, a respective version associated with the image file, and may compare the respective version associated with the image file with a version associated with a current version of the image file stored in the image file store. For example, the imaging platform may determine that the image file stored on the client device is version 1.0 of the image file and may determine that the updated version of the image file stored in the image file store is version 1.2 of the image file. Accordingly, the imaging platform may determine that the image file stored on the client device is a not the current version of the image file based on the version 1.0 being older or prior to version 1.2.

Turning now to FIG. 1H, and as shown by reference number 124, the imaging platform may identify the current version of the image file, stored in the image file store, based on determining that the client device is not storing the current version of the image file. As shown by reference number 126, the imaging platform may determine, based on identifying the current version of the image file, a bandwidth allocation for transmitting the updated version of the image file to the client device. The bandwidth allocation may specify an amount of available bandwidth associated with a network connection of the client device that may be used by the imaging platform to transmit the current version of the image file to the client device. For example, the bandwidth allocation may specify that the imaging platform may transmit the current version of the image file to the client device using a portion (e.g., 30%, 50%, 70%, and/or the like) of the available bandwidth associated with the network connection of the client device.

In some implementations, the bandwidth allocation may vary based on a time of day. For example, the bandwidth allocation may specify that the imaging platform may transmit the current version of the image file to the client device using 30% of the available bandwidth associated with the network connection of the client device during the hours of 9:00 am and 7:00 pm. It may further determine that it may use 80% of the available bandwidth associated with the network connection of the client device during the hours of 7:00 pm and 8:00 am. In this way, the imaging platform may transmit the current version of the image file to the client device in a way that does not utilize the entire available bandwidth associated with a network connection of the client device when the client device is likely to be active, which allows the client device to utilize the network connection for other functions while receiving the current version of the image file. Moreover, this allows the imaging platform to utilize a greater percentage of the available bandwidth associated with the network connection of the client device when the client device is likely to be idle.

The available bandwidth of the network connection associated with the client device may be defined as an amount of data that can be transferred to the client device (i.e., downloaded) in a given period of time. For example, the available bandwidth of the network connection associated with the client device may be defined in megabits per second (Mbps) megabytes per second (Mb/s), gigabits per second (Gbps), gigabytes per second (Gb/s), and/or the like. The imaging platform may determine the available bandwidth of the network connection associated with the client device based on various factors and/or using various techniques. For example, the imaging platform may transmit a test file to the client device and may determine the available bandwidth based on transmitting the test file to the client device (e.g., based on a rate of transfer of the test file to the client device). As an example, the imaging platform may transmit the test file to the client device and may determine the rate of transfer of the test file to the client device to be 100 Mbps, and may therefore determine that the available bandwidth is 100 Mbps. In some implementations, the imaging platform may transmit a plurality of test files to the client device, and may determine the available bandwidth by averaging the rate of transfers of the plurality of test files.

In some implementations, the imaging platform may determine the bandwidth allocation for transmitting the current version of the image file to the client device based on one or more properties associated with a network connection of the client device, based on one or more properties associated with the client device, based on one or more properties associated with a site at which the client device is located, and/or the like. The one or more properties associated with the network connection of the client device may include a network connection type (e.g., Wi-Fi, wired Ethernet, virtual private network (VPN), and/or the like) associated with the network connection of the client device, a quantity of other client devices in the same subnet as the client device, a quantity of other devices located at the same site as the client device, and/or the like. As an example, the imaging platform may determine the bandwidth allocation to be 50% of the available bandwidth associated with the network connection of the client device based on determining that the network connection type of the network connection of the client device is a Wi-Fi connection.

The one or more properties associated with the client device may include an organizational role assigned to the client device or a usage pattern associated with the client device (e.g., information identifying one or more times a day the client device is active and/or idle). For example, the imaging platform may determine that the client device is assigned a media streaming role (e.g., a client device that displays content in a retail store by streaming promotional videos from the Internet), and may therefore determine the bandwidth allocation to be 20% of the available bandwidth associated with the network connection of the client device during store hours and 80% of the of the available bandwidth associated with the network connection of the client device outside of store hours.

The one or more properties associated with the site may include a site type (e.g., a retail store, an office, a training center, etc.), a type of Internet service associated with the site (e.g., a T1 Internet service, a wireless Internet service, a broadband Internet service, a satellite Internet service, etc.), hours of operation associated with the site, and/or the like. For example, the imaging platform may determine that the client device is located at an office site that has a T1 Internet connection, and may therefore determine the bandwidth allocation to be 50% of the available bandwidth associated with the network connection of the client device during office hours and 90% of the of the available bandwidth associated with the network connection of the client device outside of office hours.

In some implementations, the imaging platform may transmit an instruction associated with the current version of the image file to the client device, and may determine the bandwidth allocation for transmitting the current version of the image file to the client device based on an instruction type associated with the instruction. For example, the instruction may be an instruction to repair the client device (e.g., because the client device is unable to boot an OS installed on the client device), and the imaging platform may determine the bandwidth allocation to be 95% of the available bandwidth associated with the network connection of the client device based on the instruction being a repair instruction. In this way, since the client device is not bootable and unable to use the network connection associated with the client device, the imaging platform may utilize most of the available bandwidth associated with the network connection of the client device to quickly repair the client device.

In some implementations, the imaging platform may dynamically adjust the bandwidth allocation for transmitting the current version of the image file to the client device. For example, the imaging platform may determine that the imaging platform is transmitting the current version of the image file to the client device at a transfer rate that is less than the bandwidth allocation for transmitting the current version of the image file. This may occur when, for example, a user of the client device is actively using the network connection associated with the client device. The imaging platform may reduce the bandwidth allocation for transmitting the current version of the image file to the client device based on determining that the imaging platform is transmitting the current version of the image file to the client device at the transfer rate that is less than the bandwidth allocation for transmitting the current version of the image file. In this way, the imaging platform may dynamically adjust the bandwidth allocation based on client device activity to ensure that transmitting the current version of the image file to the client device does not adversely affect the client device's use of the network connection associated with the client device.

Turning now to FIG. 1I, and as shown by reference number 128, the imaging platform may transmit a mapping table associated with the current version of the image file to the client device. The mapping table for the current version of the image file may be generated as described above. As shown by reference number 130, the imaging platform may transmit, based on the determined bandwidth allocation, the current version of the image file to the client device.

In some implementations, the imaging platform may transmit, based on the mapping table, a portion of the current version of the image file to the client device. For example, the imaging platform may transmit the portion of the current version of the image file based on determining that the portion is different from a corresponding portion of the image file stored on the client device. The client device may receive the mapping table and the portion of the current version of the image file, and may generate a copy of the current version of the image file by combining, based on the mapping table, the portion of the current version of the image file with one or more unchanged portions of the image file stored on the client device. In this way, the imaging platform reduces network resource usage by transmitting less than the entire current version of the image file to the client device.

In some implementations, if the transfer of the current version of the image file to the client device fails to complete (e.g., because the network connection of the client device was terminated, because the client device lost the connection to the imaging platform, etc.), the imaging platform and the client device may resume the transfer instead of retransferring the entire current version of the image file. For example, the client device may determine that a file size of the current version of the image file received at the client device is less than an expected file size. In this case, the client device may transmit, based on determining that the size of the current version of the image file received at the client device is less than the expected file size, a request to the imaging platform to resume transferring the current version of the image file. The imaging platform, based on receiving the request, may determine an amount of data, associated with the current version of the image file, that has been already transferred to the client device (e.g., based on the file size of the current version of the image file on the client device), and may resume the transfer of the current version of the image file based on the amount of data that has already been transferred to the client device. For example, the imaging platform may determine that file size of the current version of the image file on the client device is 10,130 megabytes and the expected file size for the current version of the image file is 10,230 megabytes, and may therefore resume the transfer of the current version of the image file at megabyte 10,131. In this way, the imaging platform may resume the transfer of the current version of the image file instead of retransferring the entire current version of the image file, which reduces the amount of data transmitted over the network.

Turning now to FIG. 1J, in some implementations, instead of transmitting an image file directly to a client device of the one or more client devices (e.g., client device 1, client device 2, and/or the like), the imaging platform may transmit the image file to the PXE server on the same subnet as the client device, along with instructions for the PXE server to transmit the image file to the client device. As shown by reference number 132, the imaging platform may transmit an image file (or aggregated image file) to the PXE server. In some implementations, the imaging platform may transmit the image file to the PXE server based on a bandwidth allocation, as described above. In some implementations, the imaging platform may transmit a mapping table associated with the image file, as described above. As shown by reference number 134, the imaging platform may transmit an instruction to the PXE server. The instruction may be an instruction to transmit the image file to a client device (e.g., client device 1), to install a software element on the client device from the image file, and/or the like. As shown by reference number 136, the PXE server may transmit, based on the instruction, the image file to client device 1. In some implementations, client device 1 may store the image file on client device 1, install the software element from the image file on client device 1, transmit the image file to another client device (e.g., client device 2), and/or the like. In this way, the imaging server may store the image file in a centralized location in the subnet so that the image file may be locally transferred to the client devices in the subnet.

Turning now to FIG. 1K, the imaging platform may transmit various instructions to the one or more client devices in the subnet. As shown by reference number 138, the imaging platform may transmit an instruction to client device 1. The instruction may be an instruction to transmit an image file, stored on client device 1, to client device 2. As shown by reference number 140, client device 1 may transmit the image file to client device 2 based on receiving the instruction from the imaging platform. In this way, the image file may be locally transferred from client device 1 to client device 2 using the subnet instead of transferring the image file from the imaging platform to client device 2 over the network, which reduces the amount of network resources used to transmit the image file to client device 2.

Turning now to FIG. 1L, the imaging platform may transmit an instruction to a client device in the subnet (e.g., client device 2), based on receiving information from client device 2. In some implementations, the imaging platform may select a client device (e.g., client device 2), of the one or more client devices, the PXE server, or another device in the subnet, as a master device for the subnet. The master device may manage the other client devices (e.g., client device 1 and/or the like) in the subnet, and may transmit information associated with the other client devices in the subnet to the imaging platform. For example, client device 2 may determine that client device 1 is in an idle state. The idle state may be a state where client device 1 is in a sleep mode or a standby mode, where one or more devices of client device 1 are turned off, and an operating state of client device 1 is stored in a memory component so that client device 1 may use the stored operating state to resume operations when client device 1 transitions into an active state. As shown by reference number 142, client device 2 may transmit, to the imaging platform, information identifying that client device 1 is in the idle state.

Turning now to FIG. 1M, the imaging platform may receive the information identifying that client device 1 is in the idle state, and may perform an action based on receiving the information. For example, the imaging platform may seek to transmit an image file to client device 1, but client device 1 is in the idle state. Accordingly, as shown by reference number 144 the imaging platform may transmit an instruction to client device 2. The instruction may be an instruction to transmit a wake instruction to client device 1. As shown by reference number 146, client device 2 may transmit the wake instruction to client device 1 based on receiving the instruction from the imaging platform. In some implementations, the wake instruction may include information indicating to client device 1 that the imaging platform is attempting to transfer the image file to client device 1.

As shown by reference number 148, client device 1 may transition from the idle state to the active state, which, as explained above, may include loading the operating state stored in the memory component of client device 1 to resume operations of client device 1. As shown by reference number 150, client device 1 may transmit, based on receiving the wake command and transitioning to the active state, a request for the image file to the imaging platform.

Turning now to FIG. 1N, and as shown by reference number 152, the imaging platform may receive the request from client device 1, and may transmit the image file to client device 1 based on receiving the request.

In some implementations, the imaging platform may transmit other instructions to the one or more client devices in the subnet, to the PXE server in the subnet, and/or another device in the subnet. For example, the imaging platform may transmit an instruction to client device 1 to install a software element (e.g., an OS, a software application, a device driver, etc.) from the image file transmitted to client device 1. In some implementations, before installing an OS from the image file, the imaging platform may transmit an instruction to client device 1 for client device 1 to transmit configuration information associated with client device 1 (e.g., one or more settings of basic input/output system (BIOS) of client device 1, information included in a trusted platform module (TPM) component on client device 1, OS version information, static IP address information associated with client device 1 so that the imaging platform may restore the static IP address of client device 1 after the OS is installed, and/or the like) to the imaging platform. In some implementations, before installing the OS from the image file, the imaging platform may transmit an instruction to client device 1 for client device 1 to change a partition table of client device 1 (e.g., from a master boot record (MBR) partition table to a globally unique identifier (GUID) partition table (GPT), and/or the like). In some implementations, the imaging platform may transmit a first instruction to client device 1 for client device 1 to transmit data stored on client device 1 to another client device in the subnet (e.g., client device 2) before installing the OS from the image file. After client device 1 installs the OS, the imaging platform may transmit a second instruction to client device 1 for client device 1 to obtain the data stored on client device 2. In this way, the data is not overwritten or erased by installation of the OS on client device 1.

In some implementations, the imaging platform may transmit an instruction to the master device and/or the PXE server based on detecting an event in the subnet. For example, the imaging platform may be transferring an image file to client device 1, and the master device may detect that transfer has stalled (e.g., client device 1 has received an amount of data associated with the image file in a particular time period that does not satisfy a threshold amount of data). The master device may transmit, based on determining that the transfer has stalled, a notification to the imaging platform that an event has occurred (i.e., the transfer of the image file to client device 1 has stalled) in the subnet. Based on the notification, the imaging platform may transmit an instruction to the master device to provide a reboot instruction to client device 1 to reboot client device 1. Client device 1 may reboot based on receiving the reboot instruction, and may attempt to resume the transfer after rebooting, as described above.

In some implementations, a client device (e.g., client device 1) may transmit information to another client device in the subnet, to the PXE server, and/or to the imaging platform without receiving instructions from the other client device, the PXE server, or the imaging platform. For example, client device 1 may transmit configuration information associated with client device 1 (e.g., one or more settings of the BIOS of client device 1, information included in the TPM component on client device 1, OS version information, static IP address information associated with client device 1), status updates (e.g., an update indicating that an image file was downloaded by client device 1, a status update indicating that a software application was installed on client device 1, etc.), and/or the like to the imaging platform.

Turning now to FIG. 1O, a client device that receives an image file may determine whether the received image file is corrupted (e.g., from transmitting the image file to the client device, from storing the image file on the client device, etc.). The client device may determine if the received image file was corrupted using a hashing function, such as a secure hash algorithm (SHA), an MD5 hash algorithm, and/or the like. In some implementations, the client device may store the received image file in a storage component (e.g., a solid-state drive, a hard disk drive, and/or the like) on the client device, generate a hash value for the received image file (e.g., using a hashing function listed above), may compare the generated hash value with an expected hash value for the received image file, and may determine that the received image file was corrupted based on determining that the generated hash value does not match the expected hash value. However, the storage component may be a relatively slow storage medium, such as a flash-based storage medium or a magnetic disk-based storage medium, and computing the hash value for the received image file (which may be on the order of tens of gigabytes in size), while the received image file is stored in the storage component, may take a significant amount of time.

To reduce the amount of time it takes to compute the hash value for the received image file, the client device may compute a plurality of intermediate hash values for the received image file, while the received image file is in a memory component on the client device (which may be a medium, such as a dynamic random access memory (DRAM), a nonvolatile random access memory (NVRAM), and/or the like, that is relatively faster than the medium of the storage component), and may compute a final hash value for the received image file from the plurality of intermediate hash values.

As shown by reference number 154, the client device may provide a request to the imaging platform for the image file. In some implementations, the image file may be an aggregated image file, as described above. As shown by reference number 156, the imaging platform may receive the request, segment the image file into a plurality of portions (e.g., 50 megabyte portions, 100 megabyte portions, etc.), and transmit the plurality of portions of the image file to the client device. In some implementations, the imaging platform may determine and/or adjust the size of the plurality of portions.

For example, the imaging platform may determine a size of the memory component on the client (e.g., by requesting information, from the client device, identifying the size of the memory component), and may determine the size of the plurality of the portions based on the size of the memory component on the client device.

As shown by reference number 158, the client device may receive a portion, of the plurality of portions, of the image file, and may store the portion of the image file in the memory component on the client device. As shown by reference number 160, while the portion of the image file is still in the memory component on the client device, the client device may generate an intermediate hash value for the portion of the image file. The intermediate hash value may be a hash value specific to the portion of the image file. The client device may generate the intermediate hash value using one or more of the hashing functions described above.

As shown by reference number 162, the client device may transfer, based on generating the intermediate hash value for the portion of the image file, the portion of the image file to the storage component on the client device. In some implementations, the client device may store the portion of the image file as an electronic file in the storage component. The client device may repeat the actions described in connection with reference numbers 158-162 for the remaining portions, in the plurality of portions, of the image file.

Turning now to FIG. 1P, and as shown by reference number 164, the client device may combine the plurality of portions of the image file, in the storage component on the client device, to generate a copy of the image file. For example, the client device may combine the plurality of portions of the image file by combining the plurality of electronic files, associated with the plurality of portions of the image file, into a single electronic file associated with the copy of the image file.

As shown by reference number 166, the client device may generate a final hash value for the copy of the image file. The client device may generate the final hash value based on the plurality of intermediate hash values. For example, the client device may generate the final hash value by concatenating the intermediate hash values, by using the intermediate hash values in a hashing function described above, and/or the like.

As shown by reference number 168, the client device may compare the final hash value for the copy of the image file with an expected hash value for the copy of the image file. The client device may determine whether the final hash value and the expected hash value match. For example, the final hash value and the expected hash value may each be a string of alphanumeric characters, and the client device may compare the string of alphanumeric characters for the final hash value with the string of alphanumeric characters for the expected hash value. If the string of alphanumeric characters for the final hash value and the string of alphanumeric characters for the expected hash value are the same, the client device may determine that the final hash value and the expected hash value match.

As shown by reference number 170, the client device may store, on the client device, the copy of the image file based on determining that the final hash value and the expected hash value match. The client device may store the copy of the image file in an image file store (e.g., a file folder, an archive, and/or the like) on the storage component of the client device. In some implementations, if the client device determines that the final hash value and the expected hash value do not match, the client device may discard the copy of the image file (e.g., by deleting the copy of the image file from the storage component) and transmit a request to the imaging platform to retransmit the image file to the client device.

The number and arrangement of devices and networks shown in FIGS. 1A-1P are provided as an example. In practice, there may be additional devices and/or networks, fewer devices and/or networks, different devices and/or networks, or differently arranged devices and/or networks than those shown in FIGS. 1A-1P. Furthermore, two or more devices shown in FIGS. 1A-1P may be implemented within a single device, or a single device shown in FIGS. 1A-1P may be implemented as multiple, distributed devices. Additionally, or alternatively, a set of devices (e.g., one or more devices) shown in FIGS. 1A-1P may perform one or more functions described as being performed by another set of devices of FIGS. 1A-1P.

Figure 2:
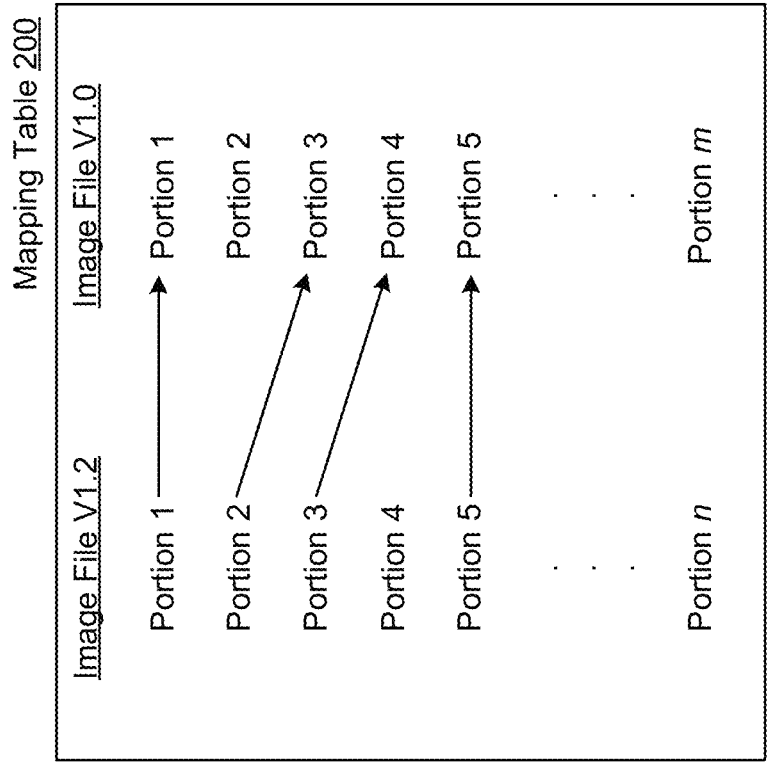
FIG. 2 is a diagram of an example mapping table.

FIG. 2 is a diagram of an example mapping table 200. In some implementations, an imaging platform may generate mapping table 200, and may transmit mapping table 200 to a client device, as described above in connection with FIGS. 1A-1P. In some implementations, the client device may receive mapping table 200, and may use mapping table 200 to request, from the imaging platform, one or more portions of a first version (e.g., a current version, an updated version, a new version, etc.) of an image file (e.g., image file v1.2) that are unchanged from a second version (e.g., a previous version, an older version, and outdated version, etc.) of the image file (e.g., image file v1.0) stored on the client device.

As shown in FIG. 2, mapping table 200 may include information identifying a first plurality of portions included in image file v1.2 (e.g., portion 1 through portion n, where n≥1), information identifying a second plurality of portions included in image file v1.0 (e.g., portion 1 through portion m, where m≥1). In some implementations, a quantity of the first plurality of portions may be the same as a quantity of the second plurality of portions. In some implementations, the quantity of the first plurality of portions may be different from the quantity of the second plurality of portions. As explained above in connection with FIGS. 1A-1P, the plurality of portions included in image file v1.2 and/or image file v1.0 may include a software element, an electronic file included in a software element, a segment of data of a specific quantity (e.g., a 512 kilobyte segment of data, a 1 megabyte segment of data, etc.), and/or the like.

As further shown in FIG. 2, mapping table 200 may include information identifying whether portion 1 through portion n of image file v1.2 match (and are thus unchanged from) any of portion 1 through portion m of image file v1.0. For example, and as shown in FIG. 2, a first portion, of the first plurality of portions, included in image file v1.2 (e.g., portion 1 of image file v1.2) and a second portion, of the second plurality of portions, included in image file v1.0 (e.g., portion 1 of image file v1.0) match (thus indicating that the first portion is unchanged from the second portion), whether a third portion, of the first plurality of portions, included in image file v1.2 (e.g., portion 2 of image file v1.2) and a fourth portion, of the second plurality of portions, included in image file v1.0 (e.g., portion 3 of image file v1.0) match (thus indicating that the third portion is unchanged from the fourth portion), and so on. Portion 1 of image file v1.2 and Portion 1 of image file v1.0 may be identified as a match if one or more bits in Portion 1 of image file v1.2 and one or more bits in Portion 1 of image file v1.0 match. For example, Portion 1 of image file v1.2 may be a 1 megabyte segment of data included in image file v1.2, and Portion 1 of image file v1.0 may be a 1 megabyte segment of data included in image file v1.0. The 1 megabyte segment of data included in image file v1.2 and the 1 megabyte segment of data included in image file v1.0 may be identified as a match if the one or more bits in the 1 megabyte segment of data included in image file v1.2 and the one or more bits in the 1 megabyte segment of data included in image file v1.0 match.

If a portion of image file v1.2 has no corresponding portion in image file v1.0 (e.g., portion 3 of image file v1.2), mapping table 200 may include information identifying that the portion of image file v1.2 is new from image file v1.0. If a portion of image file v1.0 has no corresponding portion in image file v1.2 (e.g., portion 2 of image file v1.0), mapping table may include information identifying that the portion of image file v1.0 is not included in image file v1.2.

Figure 3:
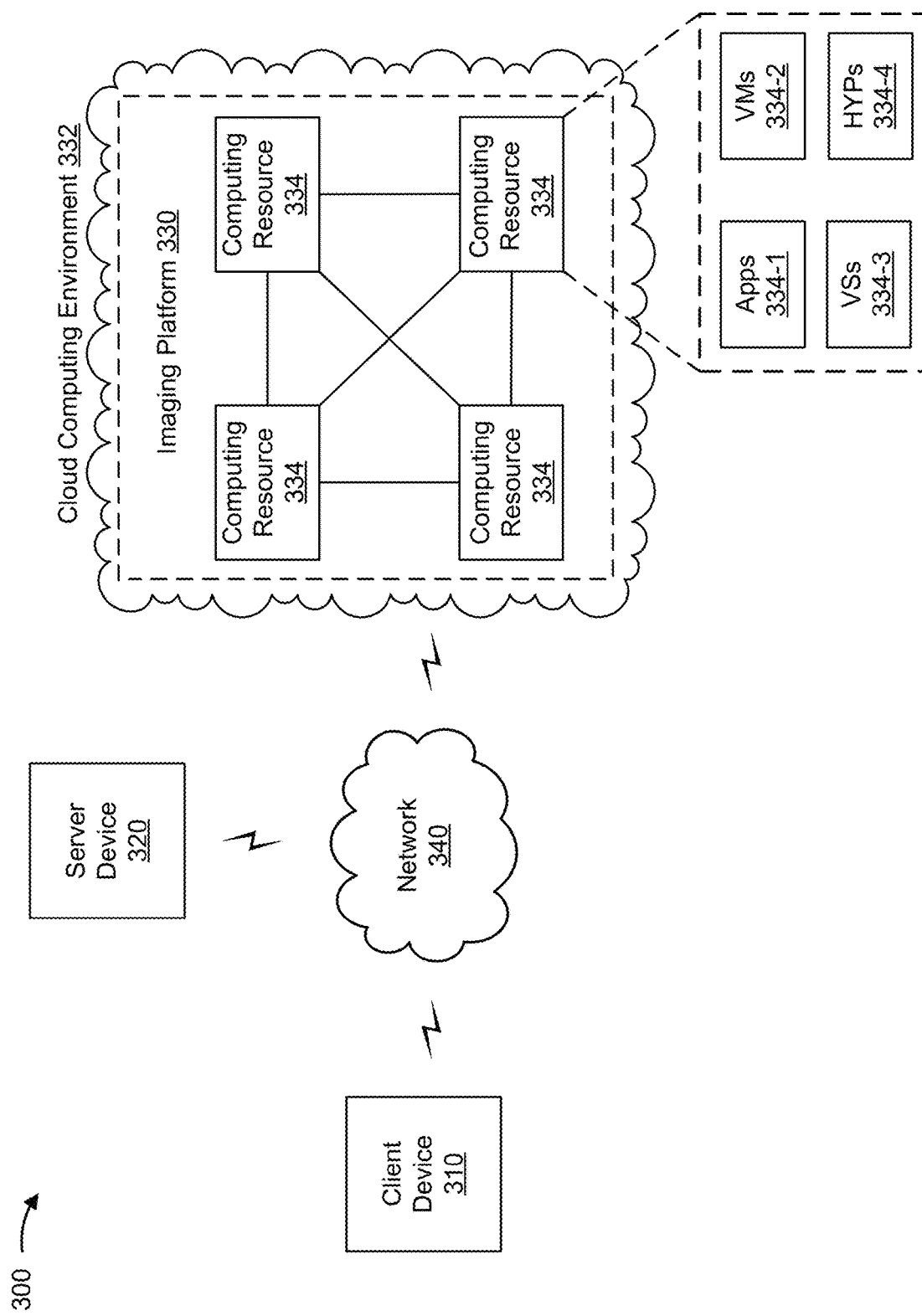
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include a client device 310, a server device 320, an imaging platform 330 in a cloud computing environment 332 that includes a set of computing resources 334, and a network 340. Devices of environment 300 may interconnect via wired connections, wireless connections, or a combination of wired and wireless connections.

Client device 310 includes one or more devices capable of receiving, generating, storing, processing, and/or providing data associated with an image file. For example, client device 310 may transmit information to imaging platform 330 (e.g., version information associated with an image file stored on client device 310, BIOS configuration information for client device 310, information included in a TPM component included in client device 310, etc.). As another example, client device 310 may request an image file (e.g., from another client device 310, server device 320, imaging platform 330, etc.) and may receive the image file (e.g., from another client device 310, server device 320, imaging platform 330, etc.). In some implementations, client device 310 may receive a plurality of portions of an image file, and may combine the plurality of portions of the image file. As another example, client device 310 may receive an instruction (e.g., from another client device 310, server device 320, imaging platform 330, etc.), and may perform an action associated with the instruction (e.g., install a software element from an image file, transmit an instruction to another client device 310, transmit an image file to another client device 310, etc.). In some implementations, client device 310 may include a device equipped with a communication interface, such as a mobile phone (e.g., a smart phone, a radiotelephone, etc.), a desktop computer, a laptop computer, a tablet computer, a handheld computer, or a similar type of device.

Server device 320 includes one or more devices capable of receiving, generating storing, processing, and/or providing data associated with an image file. For example, server device 320 may receive an image file from imaging platform 330, and may transmit the image file to client device 310. As another example, server device 320 may receive an instruction from imaging platform 330, and may transmit another instruction (e.g., an instruction to install a software element from the image file) based on receiving the instruction. As another example, server device 320 may transmit an image file to client device 310 based on receiving a request, from client device 310, for the image file. In some implementations, server device 320 may be a preboot execution environment (PXE) server. In some implementations, server device 320 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 320 may include a communication interface that allows server device 320 to receive information from and/or transmit information to other devices in environment 300. In some implementations, server device 320 may be a physical device implemented within a housing, such as a chassis. In some implementations, server device 320 may be a virtual device implemented by one or more computer devices of a cloud computing environment or a data center.

Imaging platform 330 includes one or more devices capable of generating and managing image files. For example, imaging platform 330 may receive an image file, generate an aggregated image from the image file (e.g., including a plurality of permutations of the image file), transmit the aggregated image file (or another image file) to client device 310, server device 320, and/or the like. As another example, imaging platform 330 may transmit an instruction to client device 310, server device 320, and/or the like, such as an instruction to install a software element from an image file, an instruction to transmit another instruction to client device 310, server device 320, and/or the like, an instruction to provide information to imaging platform 330, and/or the like. In some implementations, as shown, imaging platform 330 may be hosted in cloud computing environment 332. Notably, while implementations described herein describe imaging platform 330 as being hosted in cloud computing environment 332, in some implementations, imaging platform 330 may not be cloud-based (i.e., may be implemented outside of a cloud computing environment) or may be partially cloud-based.

Cloud computing environment 332 includes an environment that hosts imaging platform 330. Cloud computing environment 332 may provide computation, software, data access, storage, and/or other services. As shown, cloud computing environment 332 may include a group of computing resources 334 (referred to collectively as "computing resources 334" and individually as "computing resource 334").

Computing resource 334 includes one or more personal computers, workstation computers, server devices, or another type of computation and/or communication device. In some implementations, computing resource 334 may host imaging platform 330. The cloud resources may include compute instances executing in computing resource 334, storage devices provided in computing resource 334, data transfer devices provided by computing resource 334, etc. In some implementations, computing resource 334 may communicate with other computing resources 334 via wired connections, wireless connections, or a combination of wired and wireless connections.

As further shown in FIG. 3, computing resource 334 may include a group of cloud resources, such as one or more applications ("APPs") 334-1, one or more virtual machines ("VMs") 334-2, one or more virtualized storages ("VSs") 334-3, or one or more hypervisors ("HYPs") 334-4.

Application 334-1 includes one or more software applications that may be provided to or accessed by one or more devices of environment 300. Application 334-1 may eliminate a need to install and execute the software applications on devices of environment 300. For example, application 334-1 may include software associated with imaging platform 330 and/or any other software capable of being provided via cloud computing environment 332. In some implementations, one application 334-1 may send/receive information to/from one or more other applications 334-1, via virtual machine 334-2. In some implementations, application 334-1 may include a software application associated with one or more databases and/or operating systems. For example, application 334-1 may include an enterprise application, a functional application, an analytics application, and/or the like.

Virtual machine 334-2 includes a software implementation of a machine (e.g., a computer) that executes programs like a physical machine. Virtual machine 334-2 may be either a system virtual machine or a process virtual machine, depending upon use and degree of correspondence to any real machine by virtual machine 334-2. A system virtual machine may provide a complete system platform that supports execution of a complete operating system ("OS"). A process virtual machine may execute a single program, and may support a single process. In some implementations, virtual machine 334-2 may execute on behalf of a user (e.g., a user of client device 310), and may manage infrastructure of cloud computing environment 332, such as data management, synchronization, or long-duration data transfers.

Virtualized storage 334-3 includes one or more storage systems and/or one or more devices that use virtualization techniques within the storage systems or devices of computing resource 334. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 334-4 provides hardware virtualization techniques that allow multiple operating systems (e.g., "guest operating systems") to execute concurrently on a host computer, such as computing resource 334. Hypervisor 334-4 may present a virtual operating platform to the guest operating systems, and may manage the execution of the guest operating systems. Multiple instances of a variety of operating systems may share virtualized hardware resources.

Network 340 includes one or more wired and/or wireless networks. For example, network 340 may include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
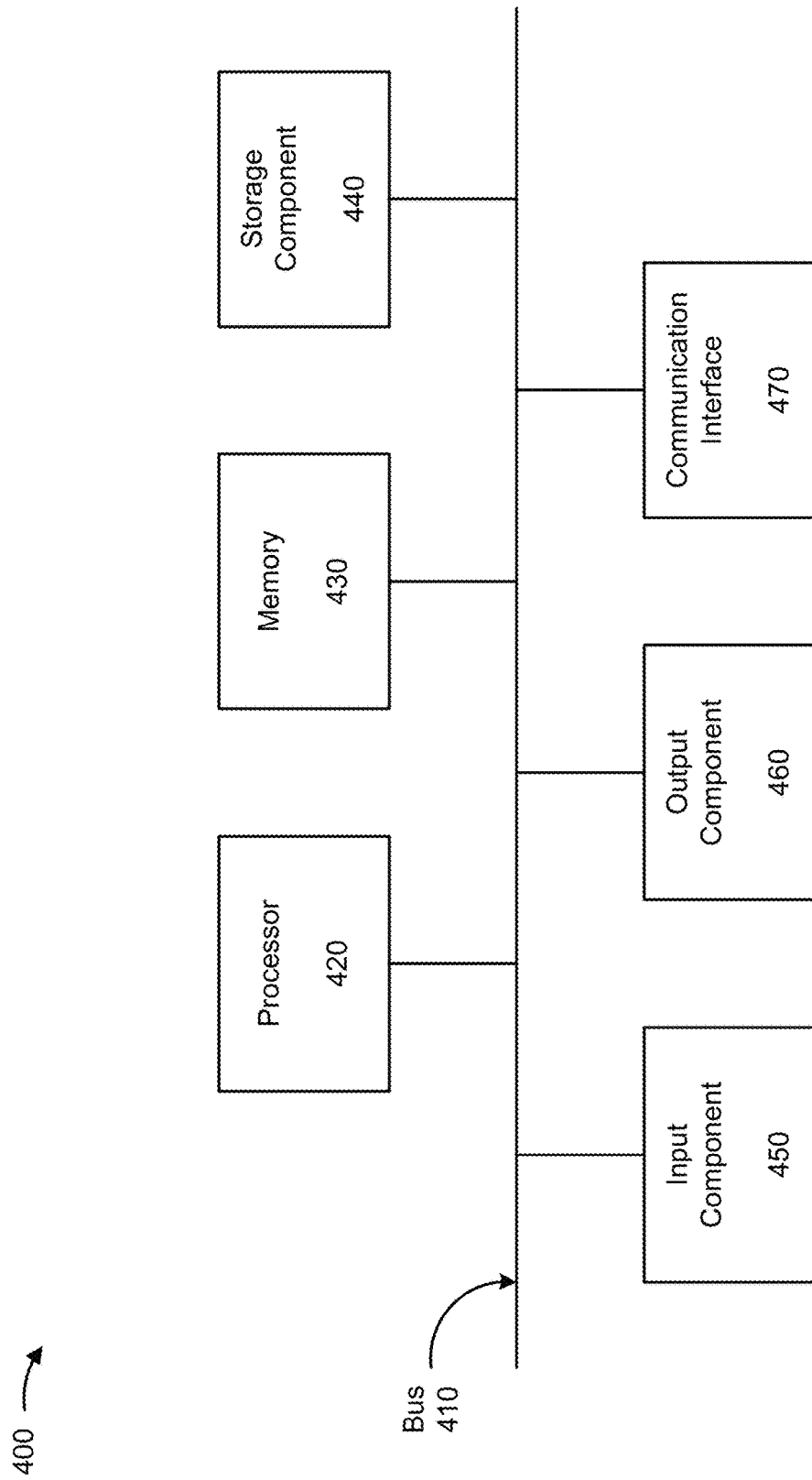
FIG. 4 is a diagram of example components of one or more devices of FIG. 3.

FIG. 4 is a diagram of example components of a device 400. Device 400 may correspond to client device 310, server device 320, imaging platform 330, and/or various devices included in network 340. In some implementations client device 310, server device 320, imaging platform 330, and/or various devices included in network 340 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
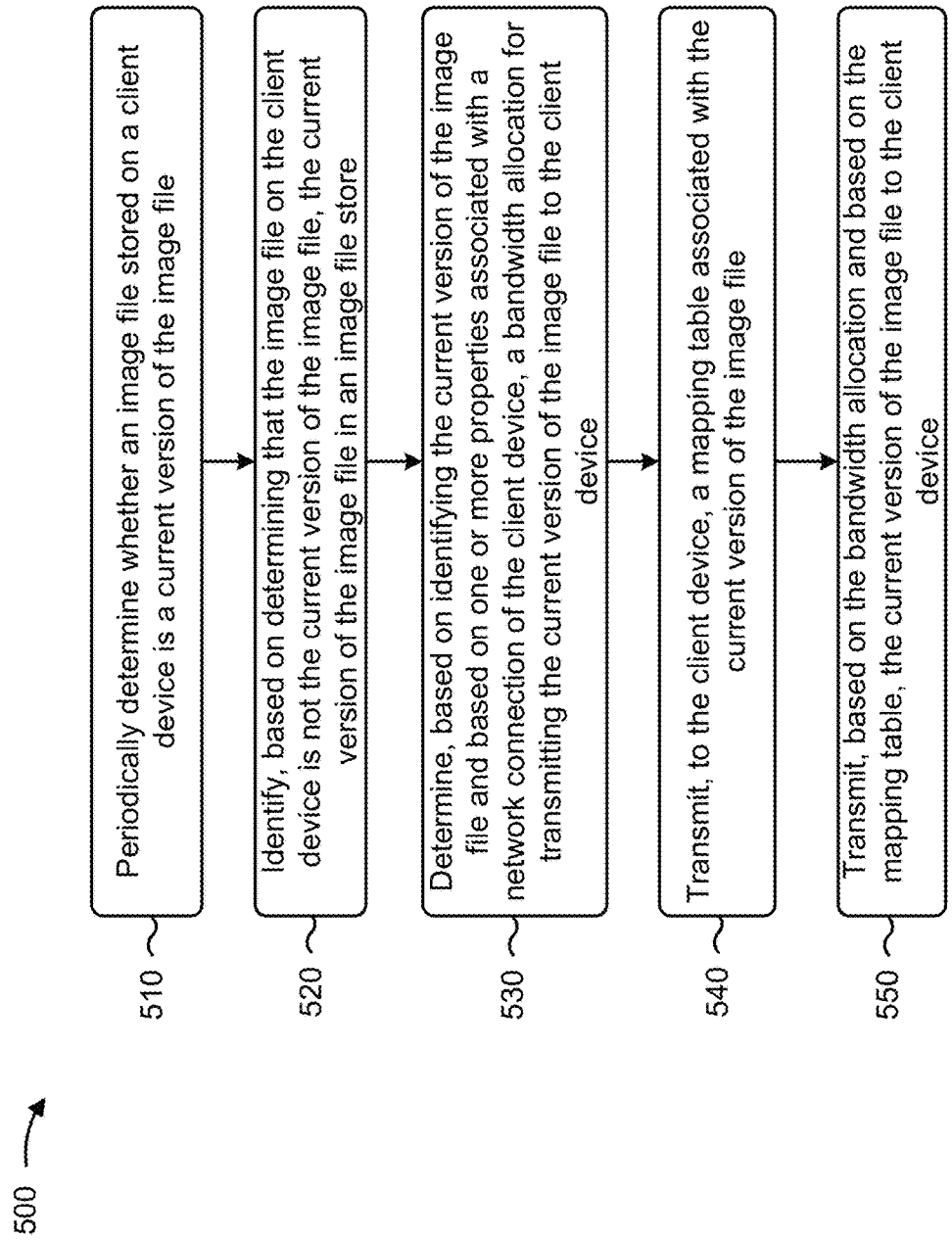
FIG. 5 is a flow chart of an example process for image file generation and management.

FIG. 5 is a flow chart of an example process 500 for image file generation and management. In some implementations, one or more process blocks of FIG. 5 may be performed by an imaging platform (e.g., imaging platform 330). In some implementations, one or more process blocks of FIG. 5 may be performed by another device or a group of devices separate from or including the imaging platform, such as a client device (e.g., client device 310), and/or a server device (e.g., server device 320).

As shown in FIG. 5, process 500 may include periodically determining whether an image file stored on a client device is a current version of the image file (block 510). For example, the imaging platform (e.g., using processor 420, memory 430, input component 450, communication interface 470, and/or the like) may periodically determine whether an image file stored on a client device is a current version of the image file, as described above in connection with FIGS. 1A-1P.

As further shown in FIG. 5, process 500 may include identifying, based on determining that the image file on the client device is not the current version of the image file, the current version of the image file in an image file store (block 520). For example, the imaging platform (e.g., using processor 420, memory 430, input component 450, communication interface 470, and/or the like) may identify, based on determining that the image file on the client device is not the current version of the image file, the current version of the image file in an image file store, as described above in connection with FIGS. 1A-1P.

As further shown in FIG. 5, process 500 may include determining, based on identifying the current version of the image file and based on one or more properties associated with a network connection of the client device, a bandwidth allocation (block 530). For example, the imaging platform (e.g., using processor 420, memory 430, input component 450, communication interface 470, and/or the like) may determine, based on identifying the current version of the image file and based on one or more properties associated with a network connection of the client device, a bandwidth allocation, as described above in connection with FIGS. 1A-1P. In some implementations, the one or more properties associated with the network connection of the client device may include at least a network connection type of a plurality of network connection types. In some implementations, the bandwidth allocation may specify an amount of bandwidth, of an available bandwidth for the network connection of the client device, that is to be used for transmitting the current version of the image file to the client device. In some implementations, the amount of bandwidth that is to be used for transmitting the current version of the image file to the client device may be less than the available bandwidth for the network connection of the client device.

As further shown in FIG. 5, process 500 may include transmitting, to the client device, a mapping table associated with the current version of the image file (block 540). For example, the imaging platform may (e.g., using processor 420, memory 430, input component 450, output component 460, communication interface 470, and/or the like) transmit, to the client device, a mapping table associated with the current version of the image file, as described above in connection with FIGS. 1A-1P.

As further shown in FIG. 5, process 500 may include transmitting, based on the bandwidth allocation and based on the mapping table, the current version of the image file to the client device (block 550). For example, the imaging platform (e.g., using processor 420, memory 430, input component 450, output component 460, communication interface 470, and/or the like) may transmit, based on the bandwidth allocation and based on the mapping table, the current version of the image file to the client device, as described above in connection with FIGS. 1A-1P.

Process 500 may include additional implementations, such as any single implementation or any combination of implementations described below and/or described with regard to any other process described herein.

In some implementations, when determining the bandwidth allocation for transmitting the image file to the client device, the imaging platform may transmit a test file to the client device, may determine, based on transmitting the test file to the client device, the available bandwidth for the network connection of the client device.

In some implementations, the network connection type may include a wired Ethernet connection, a wireless connection, and/or a VPN connection. In some implementations, each of the plurality of network connection types may be associated with a different bandwidth allocation for transmitting the current version of the image file to the client device.

In some implementations, when determining the bandwidth allocation for transmitting the current version of the image file to the client device, the imaging platform may determine the bandwidth allocation for transmitting the current version of the image file to the client device further based on a time of day that the current version of the image file is to be transmitted to the client device or a type of work order associated with the current version of the image file.

In some implementations, the imaging platform may determine that the current version of the image file is being transmitted to the client device at a transfer rate that is less than the bandwidth allocation for transmitting the current version of the image file to the client device, and may reduce the bandwidth allocation for transmitting the current version of the image file to the client device based on determining that the current version of the image file is being transmitted to the client device at the transfer rate that is less than the bandwidth allocation for transmitting the current version of the image file to the client device.

In some implementations, the mapping table, associated with the current version of the image file, may include information identifying a mapping between one or more first portions of the current version of the image file and one or more second portions of the image file stored on the client device. In some implementations, the one or more first portions of the current version of the image file may be unchanged from the one or more second portions of the image file stored on the client device.

In some implementations, when transmitting the current version of the image file to the client device, the imaging platform may transmit one or more portions of the current version of the image file to the client device. In some implementations, the one or more portions of the current version of the image file may not be included in the image file stored on the client device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
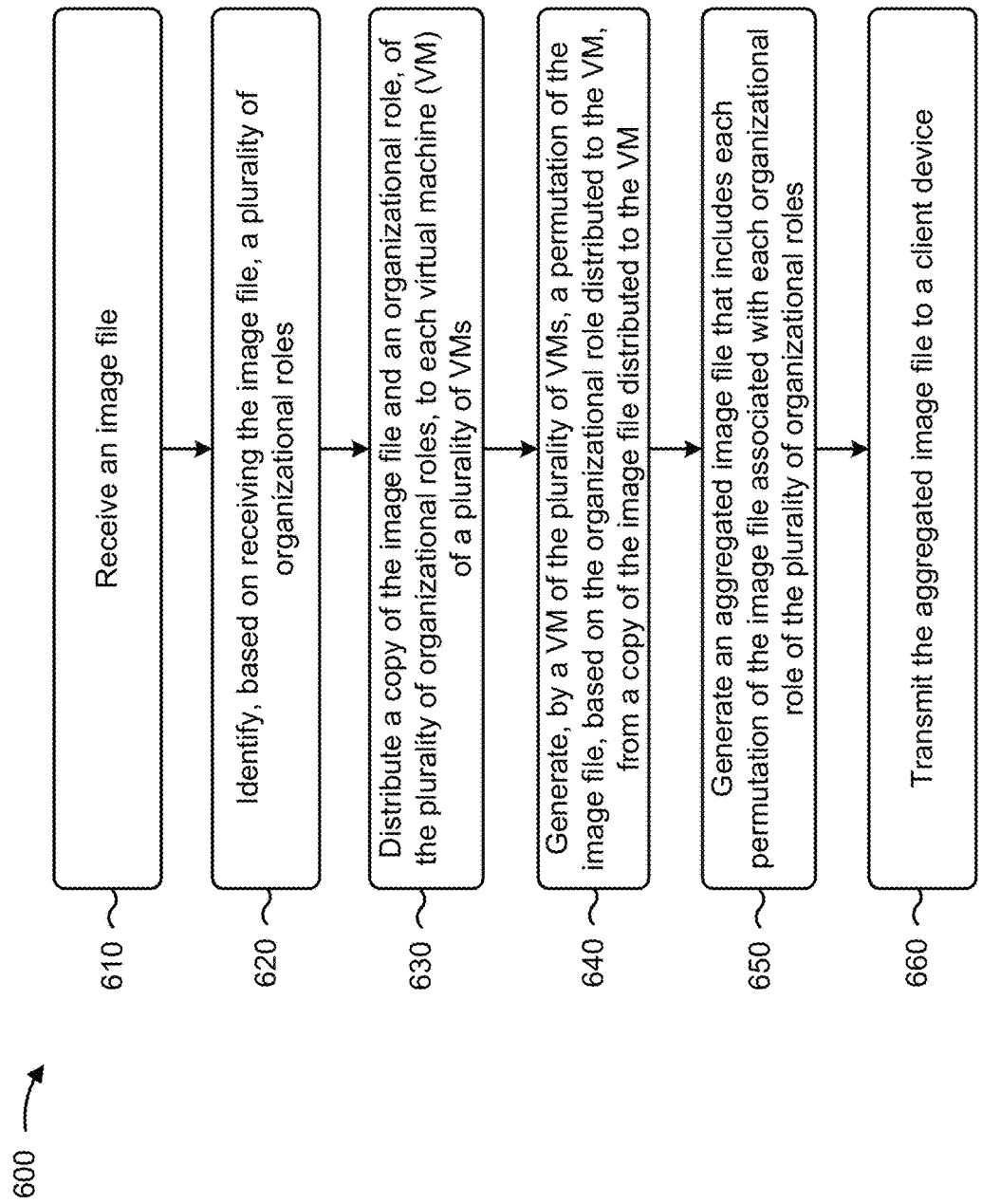
FIG. 6 is a flow chart of an example process for image file generation and management.

FIG. 6 is a flow chart of an example process 600 for image file generation and management. In some implementations, one or more process blocks of FIG. 6 may be performed by an imaging platform (e.g., imaging platform 330). In some implementations, one or more process blocks of FIG. 6 may be performed by another device or a group of devices separate from or including the imaging platform, such as a client device (e.g., client device 310), and/or a server device (e.g., server device 320).

As shown in FIG. 6, process 600 may include receiving an image file (block 610). For example, the imaging platform (e.g., using processor 420, memory 430, storage component 440, input component 450, communication interface 470, and/or the like) may receive an image file, as described above in connection with FIGS. 1A-1P.

As further shown in FIG. 6, process 600 may include identifying, based on receiving the image file, a plurality of organizational roles (block 620). For example, the imaging platform (e.g., using processor 420, memory 430, input component 450, communication interface 470, and/or the like) may identify, based on receiving the image file, a plurality of organizational roles, as described above in connection with FIGS. 1A-1P.

As further shown in FIG. 6, process 600 may include distributing a copy of the image file and an organizational role, of the plurality of organizational roles, to each VM of a plurality of VMs (block 630). For example, the imaging platform (e.g., using processor 420, memory 430, input component 450, output component 460, communication interface 470, and/or the like) may distribute a copy of the image file and an organizational role, of the plurality of organizational roles, to each VM of a plurality of VMs, as described above in connection with FIGS. 1A-1P.

As further shown in FIG. 6, process 600 may include generating, by a VM of the plurality of VMs, a permutation of the image file, based on the organizational role distributed to the VM, from a copy of the image file distributed to the VM (block 640). For example, the imaging platform may (e.g., using processor 420, memory 430, and/or the like) generate, by a VM of the plurality of VMs, a permutation of the image file, based on the organizational role distributed to the VM, from a copy of the image file distributed to the VM, as described above in connection with FIGS. 1A-1P.

As further shown in FIG. 6, process 600 may include generating an aggregated image file that includes each permutation of the image file associated with each organizational role of the plurality of organizational roles (block 650). For example, the imaging platform (e.g., using processor 420, memory 430, and/or the like) may generate, by the imaging device, an aggregated image file that includes each permutation of the image file associated with each organizational role of the plurality of organizational roles, as described above in connection with FIGS. 1A-1P.

As further shown in FIG. 6, process 600 may include transmitting the aggregated image file to a client device (block 660). For example, the imaging platform may (e.g., using processor 420, memory 430, output component 460, communication interface 470, and/or the like) transmit, by the imaging device, the aggregated image file to a client device, as described above in connection with FIGS. 1A-1P.

Process 600 may include additional aspects, such as any single aspect or any combination of aspects described below and/or in connection with one or more other processes described elsewhere herein.

In some implementations, the imaging platform may identify an organizational role, of the plurality of organizational roles, assigned to the client device, and may transmit, to the client device, an instruction to install a permutation of the image file, included in the aggregated image file, associated with the organizational role assigned to the client device.

In some implementations, when transmitting the aggregated image file to the client device, the imaging platform may transmit the aggregated image file to a plurality of client devices on a same subnet. In some implementations, when transmitting the aggregated image file to the client device, the imaging platform may transmit the aggregated image file to a PXE server on a same subnet as the client device, and may transmit an instruction to the PXE server to provide the aggregated image file to the client device.

In some implementations, when transmitting the aggregated image file to the client device, the imaging platform may provide, to the client device, a notification that the aggregated image file is available in an image store, may receive, from the client device and based on the notification, a request for the aggregated image file, and may transmit the aggregated image file to the client device based on receiving the request.

In some implementations, the imaging platform may generate a mapping table for the aggregated image file, and may transmit the aggregated image file to the client device based on the mapping table. In some implementations, the mapping table for the aggregated image file may include information identifying a mapping between one or more first portions of the aggregated image file and one or more second portions of another version of the aggregated image file. In some implementations, the one or more first portions of the aggregated image file may be unchanged from the one or more second portions of the other version of the aggregated image file.

In some implementations, the imaging platform may, prior to transmitting the aggregated image file to the client device, detect that the client device is in an idle state, and may transmit, to a master device on a same subnet as the client device, an instruction to provide the client device with a wake instruction based on detecting that the client device is in the idle state.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for image file generation and management. In some implementations, one or more process blocks of FIG. 7 may be performed by a client device (e.g., client device 310). In some implementations, one or more process blocks of FIG. 7 may be performed by another device or a group of devices separate from or including the imaging platform, such as a plurality of client devices 310, a server device (e.g., server device 320) and/or an imaging platform (e.g., imaging platform 330).

As shown in FIG. 7, process 700 may include transmitting a request for an image file (block 710). For example, the client device (e.g., using processor 420, memory 430, output component 460, communication interface 470, and/or the like) may transmit a request for an image file, as described above in connection with FIGS. 1A-1P.

As further shown in FIG. 7, process 700 may include receiving, based on transmitting the request, a plurality of portions of the image file (block 720). For example, the client device (e.g., using processor 420, memory 430, input component 450, communication interface 470, and/or the like) may receive, based on transmitting the request, a plurality of portions of the image file, as described above in connection with FIGS. 1A-1P.

As further shown in FIG. 7, process 700 may include, for each portion, of the plurality of portions, of the image file, storing a portion, of the plurality of portions, of the image file in a memory on the client device, generating, while the portion of the image file is in the memory on the client device, an intermediate hash value for the portion of the image file, and transferring, based on generating the intermediate hash value for the portion of the image file, the portion of the image file to a storage drive on the client device (block 730). For example, the client device (e.g., using processor 420, memory 430, storage component 440, input component 450, output component 460, communication interface 470, and/or the like) may, for each portion, of the plurality of portions, of the image file, store a portion, of the plurality of portions, of the image file in a memory on the client device, generate, while the portion of the image file is in the memory on the client device, an intermediate hash value for the portion of the image file, and transfer, based on generating the intermediate hash value for the portion of the image file, the portion of the image file to a storage drive on the client device, as described above in connection with FIGS. 1A-1P.

As further shown in FIG. 7, process 700 may include combining the plurality of portions of the image file, in the storage drive on the client device, to generate a copy of the image file (block 740). For example, the client device (e.g., using processor 420, memory 430, storage component 440, and/or the like) may combine the plurality of portions of the image file, in the storage drive on the client device, to generate a copy of the image file, as described above in connection with FIGS. 1A-1P.

As further shown in FIG. 7, process 700 may include generating, based on the intermediate hash values for the plurality of portions of the image file, a final hash value for the copy of the image file (block 750). For example, the client device (e.g., using processor 420, memory 430, and/or the like) may generate, based on the intermediate hash values for the plurality of portions of the image file, a final hash value for the copy of the image file, as described above in connection with FIGS. 1A-1P.

As further shown in FIG. 7, process 700 may include comparing the final hash value to an expected hash value for the copy of the image file (block 760). For example, the client device (e.g., using processor 420, memory 430, and/or the like) may compare the final hash value to an expected hash value for the copy of the image file, as described above in connection with FIGS. 1A-1P.

As further shown in FIG. 7, process 700 may include storing the copy of the image file in an image file store on the client device based on determining that the final hash value matches the expected hash value (block 770). For example, the client device (e.g., using processor 420, memory 430, storage component 440, and/or the like) may store the copy of the image file in an image file store on the client device based on determining that the final hash value matches the expected hash value, as described above in connection with FIGS. 1A-1P.

Process 700 may include additional aspects, such as any single aspect or any combination of aspects described below and/or in connection with one or more other processes described elsewhere herein.

In some implementations, the client device may receive a request to provide the copy of the image file to another client device on a same subnet as the client device, and may transmit, based on receiving the request to provide the copy of the image file, the copy of the image file to the other client device.

In some implementations, the client device may receive a wake instruction from a master device on a same subnet as the client device, and may transition the client device from an idle state to an active state based on receiving the wake instruction. In some implementations, the client device, when transmitting the request for the image file, may transmit the request for the image file based on the client device transitioning from the idle state to the active state.

In some implementations, the client device may receive a mapping table associated with the image file. In some implementations, the mapping table for the image file may include information identifying a mapping between one or more first portions of the image file and one or more second portions of another version of the image file stored on the client device. In some implementations, the one or more first portions of the image file may be unchanged from the one or more second portions of the other version of the image file. In some implementations, the client device, when combining the plurality of portions of the image file, in the storage drive on the client device, may generate the copy of the image file, may combine the plurality of portions of the image file with one or more portions of the other version of the image file to generate the copy of the image file.

In some implementations, the client device may receive a mapping table associated with the image file. In some implementations, the mapping table associated with the image file may include information identifying one or more portions of the image file that are not included in another version of the image file stored on the client device. In some implementations, when transmitting the request for the image file, the client device may transmit, based on the mapping table, a request for the one or more portions of the image file that are not included in the other version of the image file stored on the client device. In some implementations, the client device may install a program, from the copy of the image file, onto the client device based on an organizational role assigned to the client device.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In this way, imaging platform 330 may store and maintain large quantities of different permutations of the image file in a single aggregated image file, which reduces the complexity of storing and maintaining the plurality of permutations of the image file. Moreover, imaging platform 330 may deduplicate the plurality of permutations of the image file when generating the aggregated image file so that common portions of the image file between the plurality of permutations are stored once in the aggregated image. In this way, imaging platform 330 reduces the amount of storage resources used to store the aggregated image file.

Additionally, in this way, by providing an imaging platform 330 capable of ensuring that a client device 310 managed by imaging platform 330 stores the most recent version of an image file by periodically determining whether client device 310 is storing a current version of the image file, and transmitting the current version of the image file to client device 310 based on determining that client device 310 is not storing the current version of the image file, if client device 310 experiences a fault and needs to be recovered or rebuilt, imaging platform 330 may recover or rebuild client device 310 using the current version of the image file stored on client device 310 instead of having to transmit the current version of the image file to client device 310 over a network, which reduces the amount of time it takes to recover or rebuild client device 310, and reduces the amount of time that client device 310 is unusable or offline.

Also, in this way, by determining and dynamically adjusting a bandwidth allocation for transmitting an image file to client device 310 over a network based on one or more properties associated with a network connection of client device 310, imaging platform 330 may transmit the image file to the client device in a way that does not adversely affect the network connection of the client device and/or network connections of other client devices 310 in the network, which conserves network resources and minimizes network latency and/or degradation in performance of network-provided services.

Furthermore, in this way, a client device 310 may be provided that receives a plurality of portions of an image file from imaging platform 330 (or from another location), and may generate a plurality of intermediate hash values, for the plurality of portions, while the plurality of portions is in a memory on the client device. Client device 310 may transfer the plurality of portions to a storage drive on client device 310, may generate a copy of the image file, and may generate a final hash value, for the copy of the image file, from the plurality of intermediate hash values. In this way, client device 310 may decrease the amount of time it takes client device 310 to generate a hash value for the copy of the image file by generating the plurality of intermediate hash values for the plurality of the portions of the image file, while the plurality of portions of the image file are in the memory on client device 310.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving an image file at an imaging device;
   identifying, by the imaging device and based on receiving the image file, a plurality of organizational roles;
   distributing, by the imaging device, a copy of the image file and an organizational role, of the plurality of organizational roles, to each virtual machine (VM) of a plurality of VMs;
   receiving, by the imaging device and from a VM of the plurality of VMs, a permutation of the image file, based on the organizational role distributed to the VM, from a copy of the image file distributed to the VM;

generating, by the imaging device, an aggregated image file that includes each permutation of the image file associated with each organizational role of the plurality of organizational roles;
generating, by the imaging device, a mapping table for the aggregated image file,
wherein the mapping table includes information identifying one or more first portions of a first version of the image file that are not included in a second version of the image file;
determining, by the imaging device and based on identifying the one or more first portions of the first version of the image file, a bandwidth allocation; and
transmitting, by the imaging device and based on the bandwidth allocation, the one or more first portions of the first version of the image file to a client device,
wherein the bandwidth allocation is dynamically adjusted based on client device activity.

2. The method of claim 1, further comprising:
identifying an organizational role, of the plurality of organizational roles, assigned to the client device; and
transmitting, to the client device, an instruction to install a permutation of the image file, included in the aggregated image file, associated with the organizational role assigned to the client device.

3. The method of claim 1, wherein transmitting the aggregated image file to the client device comprises:
transmitting the aggregated image file to a plurality of client devices on a same subnet.

4. The method of claim 1, wherein transmitting the aggregated image file to the client device comprises:
transmitting the aggregated image file to a preboot execution environment (PXE) server on a same subnet as the client device; and
transmitting an instruction to the PXE server to provide the aggregated image file to the client device.

5. The method of claim 1, wherein transmitting the aggregated image file to the client device comprises:
providing, to the client device, a notification that the aggregated image file is available in an image store;
receiving, from the client device and based on the notification, a request for the aggregated image file; and
transmitting the aggregated image file to the client device based on receiving the request.

6. The method of claim 1,
wherein the mapping table for the aggregated image file includes information identifying a mapping between one or more first portions of the aggregated image file and one or more second portions of another version of the aggregated image file, and
wherein the one or more first portions of the aggregated image file are unchanged from the one or more second portions of the other version of the aggregated image file; and
further comprising:
transmitting the aggregated image file to the client device based on the mapping table.

7. The method of claim 1, further comprising:
prior to transmitting the aggregated image file to the client device, detecting that the client device is in an idle state; and
transmitting, to a master device on a same subnet as the client device, an instruction to provide the client device with a wake instruction based on detecting that the client device is in the idle state.

8. A non-transitory computer-readable medium storing instructions, the instructions comprising:
one or more instructions that, when executed by one or more processors of a device, cause the one or more processors to:
receive an image file;
identify, based on receiving the image file, a plurality of organizational roles;
distribute a copy of the image file and an organizational role, of the plurality of organizational roles, to each virtual machine (VM) of a plurality of VMs;
receive, from a VM of the plurality of VMs, a permutation of the image file, based on the organizational role distributed to the VM, from a copy of the image file distributed to the VM;
generate an aggregated image file that includes each permutation of the image file associated with each organizational role of the plurality of organizational roles;
generating a mapping table for the aggregated image file,
wherein the mapping table includes information identifying one or more first portions of a first version of the image file that are not included in a second version of the image file;
determine, based on identifying the one or more first portions of the first version of the image file, a bandwidth allocation; and
transmit, based on the bandwidth allocation, the one or more first portions of the first version of the image file to a client device,
wherein the bandwidth allocation is dynamically adjusted based on client device activity.

9. The non-transitory computer-readable medium of claim 8, wherein the one or more instructions, when executed by the one or more processors, further cause the one or more processors to:
identify an organizational role, of the plurality of organizational roles, assigned to the client device; and
transmit, to the client device, an instruction to install a permutation of the image file, included in the aggregated image file, associated with the organizational role assigned to the client device.

10. The non-transitory computer-readable medium of claim 8, wherein the one or more instructions, that cause the one or more processors to transmit the aggregated image file to the client device, cause the one or more processors to:
transmit the aggregated image file to a plurality of client devices on a same subnet.

11. The non-transitory computer-readable medium of claim 8, wherein the one or more instructions, that cause the one or more processors to transmit the aggregated image file to the client device, cause the one or more processors to:
transmit the aggregated image file to a preboot execution environment (PXE) server on a same subnet as the client device; and
transmit an instruction to the PXE server to provide the aggregated image file to the client device.

12. The non-transitory computer-readable medium of claim 8, wherein the one or more instructions, that cause the one or more processors to transmit the aggregated image file to the client device, cause the one or more processors to:
provide, to the client device, a notification that the aggregated image file is available in an image store;
receive, from the client device and based on the notification, a request for the aggregated image file; and
transmit the aggregated image file to the client device based on receiving the request.

13. The non-transitory computer-readable medium of claim 8, wherein the mapping table for the aggregated image file includes information identifying a mapping between one or more first portions of the aggregated image file and one or more second portions of another version of the aggregated image file, and wherein the one or more first portions of the aggregated image file are unchanged from the one or more second portions of the other version of the aggregated image file; and wherein the one or more instructions, when executed by the one or more processors, further cause the one or more processors to:

transmit the aggregated image file to the client device based on the mapping table.

14. The non-transitory computer-readable medium of claim 8, wherein the one or more instructions, when executed by the one or more processors, further cause the one or more processors to:

prior to transmitting the aggregated image file to the client device, detect that the client device is in an idle state; and transmit, to a master device on a same subnet as the client device, an instruction to provide the client device with a wake instruction based on detecting that the client device is in the idle state.

15. A device, comprising:

one or more memories; and one or more processors, communicatively coupled to the one or more memories, to:

receive an image file;

identify and based on receiving the image file, a plurality of organizational roles;

distribute a copy of the image file and an organizational role, of the plurality of organizational roles, to each virtual machine (VM) of a plurality of VMs;

receive, from a VM of the plurality of VMs, a permutation of the image file, based on the organizational role distributed to the VM, from a copy of the image file distributed to the VM;

generate an aggregated image file that includes each permutation of the image file associated with each organizational role of the plurality of organizational roles;

generate a mapping table for the aggregated image file, wherein the mapping table includes information identifying one or more first portions of a first version of the image file that are not included in a second version of the image file;

determine, based on identifying the one or more first portions of the first version of the image file, a bandwidth allocation; and transmit, based on the bandwidth allocation, the one or more first portions of the first version of the image file to a client device, wherein the bandwidth allocation is dynamically adjusted based on client device activity.

16. The device of claim 15, wherein the one or more processors are further to:

identify an organizational role, of the plurality of organizational roles, assigned to the client device; and transmit, to the client device, an instruction to install a permutation of the image file, included in the aggregated image file, associated with the organizational role assigned to the client device.

17. The device of claim 15, wherein the one or more processors, when transmit the aggregated image file to the client device, are to:

transmit the aggregated image file to a plurality of client devices on a same subnet.

18. The device of claim 15, wherein the one or more processors, when transmit the aggregated image file to the client device, are to:

transmit the aggregated image file to a preboot execution environment (PXE) server on a same subnet as the client device; and transmit an instruction to the PXE server to provide the aggregated image file to the client device.

19. The device of claim 15, wherein the one or more processors, when transmit the aggregated image file to the client device, are to:

provide, to the client device, a notification that the aggregated image file is available in an image store;

receive, from the client device and based on the notification, a request for the aggregated image file; and transmit the aggregated image file to the client device based on receiving the request.

20. The device of claim 15, wherein the mapping table for the aggregated image file includes information identifying a mapping between one or more first portions of the aggregated image file and one or more second portions of another version of the aggregated image file, and wherein the one or more first portions of the aggregated image file are unchanged from the one or more second portions of the other version of the aggregated image file; and wherein the one or more processors are further to:

transmit the aggregated image file to the client device based on the mapping table.

* * * * *